(12) United States Patent
Meiyappan et al.

(10) Patent No.: US 11,503,405 B2
(45) Date of Patent: Nov. 15, 2022

(54) CAPTURING AND SYNCHRONIZING DATA FROM MULTIPLE SENSORS

(71) Applicant: BOSE CORPORATION, Framingham, MA (US)

(72) Inventors: Somasundaram Meiyappan, Chennai (IN); Nathan Blagrove, Hanover, MA (US)

(73) Assignee: BOSE CORPORATION, Framingham, MA (US)

( * ) Notice: Subject to any disclaimer, the term of this patent is extended or adjusted under 35 U.S.C. 154(b) by 0 days.

(21) Appl. No.: 17/319,333

(22) Filed: May 13, 2021

(65) Prior Publication Data

US 2021/0385575 A1 Dec. 9, 2021

(30) Foreign Application Priority Data

Jun. 3, 2020 (IN) .............................. 202021023355

(51) Int. Cl.
| | |
|---|---|
| *H04R 3/00* | (2006.01) |
| *H04S 3/00* | (2006.01) |
| *H04S 7/00* | (2006.01) |
| *H04R 5/04* | (2006.01) |

(52) U.S. Cl.
CPC ............... *H04R 3/005* (2013.01); *H04R 5/04* (2013.01); *H04S 3/008* (2013.01); *H04S 7/30* (2013.01); *H04R 2430/03* (2013.01); *H04S 2420/01* (2013.01)

(58) Field of Classification Search
None
See application file for complete search history.

(56) References Cited

U.S. PATENT DOCUMENTS

| | | | |
|---|---|---|---|
| 2009/0096632 A1* | 4/2009 | Ullrich | H04N 21/8547 340/407.1 |
| 2020/0013426 A1 | 1/2020 | Sen et al. | |
| 2020/0137489 A1 | 4/2020 | Sheaffer et al. | |

FOREIGN PATENT DOCUMENTS

WO 2014055329 A1 4/2014

OTHER PUBLICATIONS

Invitation to Pay Additional Fees and Partial Search Report for International Application No. PCT/US2021/032516 dated Aug. 5, 2021.

(Continued)

*Primary Examiner* — Paul W Huber
(74) *Attorney, Agent, or Firm* — Patterson + Sheridan, LLP

(57) ABSTRACT

Processes, methods, systems, and devices are disclosed for synchronizing multiple wireless data streams captured in action by various sensors, with lost data recovery. For example, a source device may have multiple sensors acquiring data and sending the data streams (e.g., via Bluetooth connections) to a target device. Timing information may be appended for each of the data streams. Data packets of the multiple data streams may be formed with the timing information. The data packets may be transmitted to a target device that is configured to synchronize the multiple data streams using the timing information. The target device, applying the example processes or techniques of this disclosure, may accurately synchronize the multiple data streams. In some cases, the target device may capture additional data streams and the processor synchronizes all data streams of both the source and the target devices.

22 Claims, 11 Drawing Sheets

(56) References Cited

OTHER PUBLICATIONS

International Search Report and Written Opinion for International Application No. PCT/US2021/032516 dated Sep. 24, 2021.
Lovejoy, Ben, "Apple Patent Application Describes an IPhone Able to Make Binaural Recordings", Binaural recordings from an iPhone for AR applications—9to5Mac, May 4, 2020.

* cited by examiner

CAPTURING AND SYNCHRONIZING DATA FROM MULTIPLE SENSORS

CROSS-REFERENCE TO RELATED APPLICATION

This application claims priority to and benefit of Indian Patent Application No. 202021023355, filed Jun. 3, 2020, the contents of which are herein incorporated by reference in its entirety as fully set forth below.

BACKGROUND

Bluetooth is a wireless communication technology standard for exchanging data between fixed or mobile devices over short distances. In order to use the Bluetooth protocol, a device is often compatible with the subset of Bluetooth profiles (often called services) necessary to use the desired services. A Bluetooth profile is a specification regarding an aspect of Bluetooth-based wireless communication between devices. Two widely used Bluetooth profiles for communication of audio between a Bluetooth source (e.g., smartphone) and a Bluetooth accessory device (e.g., Bluetooth audio headphones) include the Hands Free Profile (HFP) and the Advanced Audio Distribution Profile (A2DP). The Bluetooth profile may be specified according to a Bluetooth standard updated from time to time.

The HFP of Bluetooth accessory devices (e.g., Bluetooth audio headphones) supports simultaneous two-way data transfer: audio output (i.e., to speaker) in one way and audio input (i.e., from microphone) in the other. The audio input, however, is limited to mono, or single-channel, microphone data. Similarly, other wireless two-way communications are often constrained to single channel communication, using multiplexing when needed. As such, wireless data from multiple different sources often face challenges to be synchronized. Close range wireless communications often use Bluetooth, which also faces multi-channel data synchronization difficulties.

The HFP is designed to exchange low latency and relatively lower quality, bi-directional voice audio (e.g., voice data related to phone calls) and has a latency of about 40 milliseconds (ms) but limits the sampling rate either to 8 kiloHertz (kHz) (narrowband, i.e. 4 kHz of audio bandwidth) or 16 kHz (wideband, i.e. 8 kHz of audio bandwidth). Wideband speech HFP packets are encoded using the low-complexity subband codec (mSBC), at a fixed rate of 64 kilobits per second (kbps). The bi-directional voice audio is limited to a single channel (i.e., mono) of voice data captured using one microphone according to the present HFP.

A2DP defines a way to send full bandwidth audio (e.g., higher quality audio such as music) in a single direction, such as from a smart phone to Bluetooth headphones. Most Bluetooth source devices choose a sampling frequency of 44.1 kHz or 48 kHz for A2DP communication. SBC is the mandatory codec used for transmitting A2DP audio and typically sends high quality audio data at around 350 kbps. Optional codecs like Advanced Audio Coding (AAC) usually send audio data at around 250 kbps. A2DP audio is sent over the Logical Link Control and Adaptation Protocol (L2CAP), which schedules packets asynchronously. This gives a source device more flexibility to interleave the higher bandwidth audio data with other radio frequency (RF) (e.g., Bluetooth & WiFi) traffic. However, more jitter is generally involved in the delivery of L2CAP packets and the source device does not guarantee when those packets will be delivered to the target device. Thus, more audio has to be buffered up by the target device before being played to avoid audio dropouts, which, as a result, increases the latency of the audio received at the target device. In other words, synchronization is difficult to achieve given the latency increase.

Accordingly, methods for communicating synchronized data of multiple channels or from multiple data sources over a wireless communication link, such as a Bluetooth link, to have multi-channel data acquisition synchronized, as well as apparatuses and systems configured to implement these methods are desired.

SUMMARY

All examples and features mentioned herein can be combined in any technically possible manner.

Aspects of the present disclosure provide a method performed by a source device for acquiring, via a number of sensors, multiple data streams. For example, the source device may be a headset having multiple microphones and other sensors. Timing information may be appended for each of the data streams. Data packets of the multiple data streams are formed with the timing information. The data packets are transmitted to a target device that is configured to synchronize the multiple data streams using the timing information.

In aspects, the timing information includes a timestamp for each data packet of the multiple data streams. The timestamp identifies a shared time instance of a subset of the multiple data streams. For example, the timestamp has a unit of one microsecond. In other aspects, the timestamp has a representative unit defined by a timescale to conserve bits. The multiple data streams have different lengths before or after compression due to different sampling rates, bits per sample, tolerance to packet losses, and other parameters.

In aspects, the subset of the multiple data streams has a same time duration as each data packet of the multiple data streams. For example, the final output of compressed data stream has the same number of bytes and duration. In other instances, a subset of the input uncompressed data stream is of the same duration.

In aspects, the multiple data streams are acquired using two or more sensors, which include at least one sensing component configured to acquire one of the multiple data streams. The two or more sensors may include at least two different types of sensors. For example, the sensors include two or more microphones for capturing a surround sound. In aspects, four or more microphones are be used for capturing a 5.1 Bluetooth channel surround sound. In other examples, the two or more sensors include at least one of a microphone, camera, accelerometer, gyroscope, magnetometers, or inertial measurement unit.

In aspects, the timing information is appended or otherwise provided according to a synchronization protocol. In an example, a time slot is provided by an initiator device and assigned to each of the multiple data streams. In an example, the initiator device broadcasts and/or negotiates a timeslot in a unicast or peer-to-peer scheme. In aspects, the scheme implements a low energy (LE) Bluetooth standard, such as the Bluetooth Core Specification version 5.2 standard. According to such standards, the data packets are transmitted using an isochronous channel. This may be referred to as LE Audio, using LE audio codec such as Low Complexity Communication Codec (LC3) when appropriate.

In aspects, the data packets of the multiple data streams are transmitted in separate channels. Each of the separate channels are associated with at least one sensor configured to capture one of the multiple data streams. In aspects, the data packets are multiplexed prior to transmitting the data packets in the separate channels.

Aspects of the present disclosure provide a method for providing sensor (e.g., audio) synchronization to a user at a target device. The method comprises receiving, from a source device, data packets associated with multiple data streams acquired using multiple sensors (e.g., microphones), decoding the multiple data streams from the received data packets, extracting timing information associated with the data packet, and synchronizing the multiple data streams using the timing information.

In aspects, a user interface is provided on the target device. The user interface is capable of accepting user input for processing the received data packets. A set of data synchronization and recovery options for the multiple streams is provided via the user interface. In aspects, a capability is provided for the user to launch a data acquisition event initiating a stream of the multiple streams.

In aspects, extracting the timing information associated with the data packets includes processing an appended timestamp for each of the received data packets, the timestamp appended to each data packet of the multiple data streams. In aspects, a shared time instance of a subset of the multiple data streams is identified. In aspects, the subset of the multiple data streams and each data packet of the multiple data streams have a same time duration.

In aspects, extracting the timing information associated with the data packets further includes identifying a synchronization time slot assigned by an initiator device for each of the multiple data streams. In aspects, the packets are received via an isochronous channel.

In aspects, the data packets are received in separate channels. In aspects, each of the channels are associated with at least one sensor configured to capture one of the multiple data streams. In aspects, the method further includes reassembling the multiple data streams using the data packets of the separate channels of sensors. In aspects, reassembling the multiple data streams using the data packets comprises prioritizing at least one of the separate channels. The prioritized channel is used as a timing reference, or signal reference, or both, for data synchronization and/or recovery.

In aspects, lost data packets are identified based on the extracted timing information. A location and an amount of lost data packets for each of the multiple data streams are identified. A recovery section of data packets are generated to replace the lost data packets. The recovery section of data packets includes at least one of silent packets, noise packets, or synthesized packets. For example, the recovery section of data packets of synthesized packets may be generated by processing one channel of the multiple data streams (e.g., a prioritized channel) having received data packets at the location of the lost data packets of another channel of the multiple data streams. In some aspects, processing the one channel of the multiple data streams may include at least one of scaling or extrapolation of the received data packets at the location of the lost data packets.

Aspects of the present disclosure provide a device including a number of sensors configured to acquire multiple data streams and a processor configured to append timing information for each of the data streams and form data packets of the multiple data streams with the timing information. The device further includes a transceiver configured to transmit the data packets to a target device configured to synchronize the multiple data streams using the timing information. In some examples, the sensors include eight microphones positioned to capture a surround sound.

In aspects, the timing information includes a timestamp for each data packet of the multiple data streams. The timestamp may identify a shared time instance of a subset of the multiple data streams. The subset of the multiple data streams and each data packet may, in some aspects, have a same time duration.

Two or more features described in this disclosure, including those described in this summary section, may be combined to form implementations not specifically described herein.

The details of one or more implementations are set forth in the accompanying drawings and the description below. Other features, objects, and advantages will be apparent from the description and drawings, and from the claims.

BRIEF DESCRIPTION OF THE DRAWINGS

Like numerals indicate like elements.

DETAILED DESCRIPTION

Figure 1:
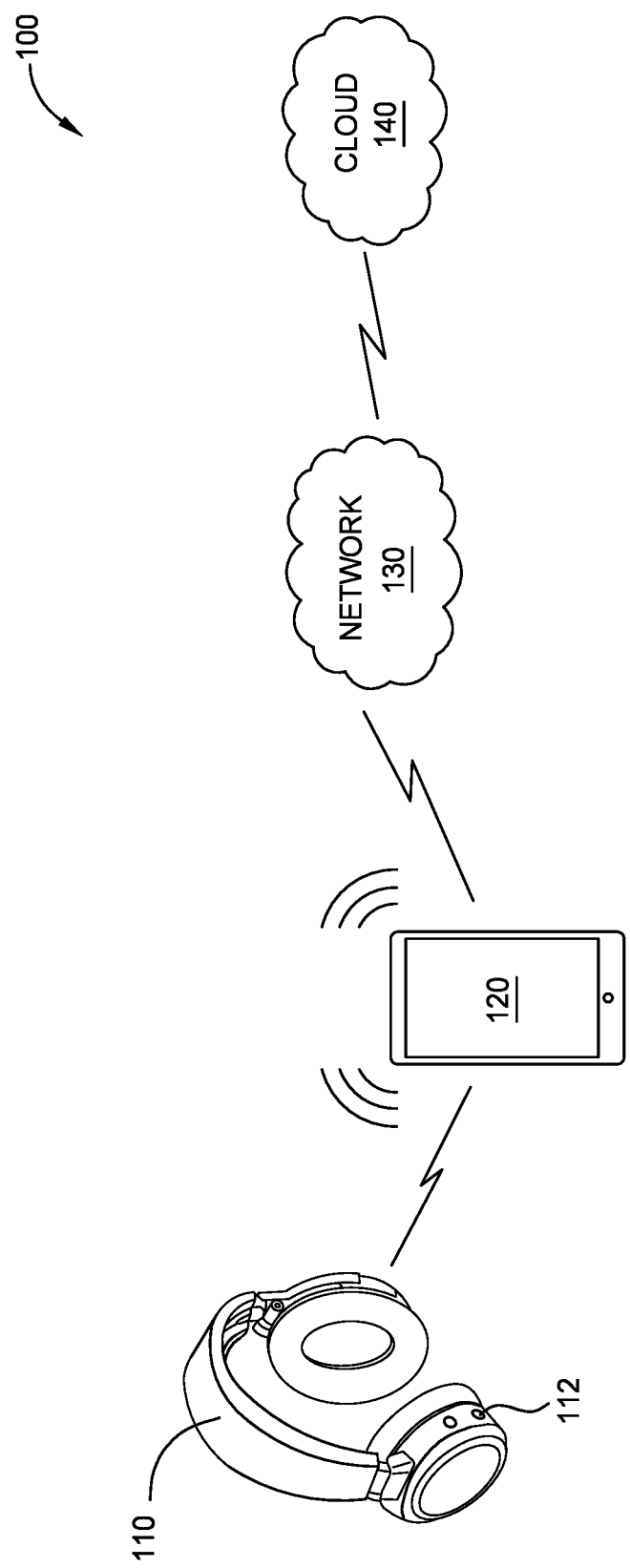
FIG. 1 illustrates an example system in which aspects of the present disclosure may be implemented.

The present disclosure provides processes, methods, systems, and devices for synchronizing multiple wireless data streams captured by various sensors. For example, a source device may have multiple sensors acquiring data. The source device may transmit the data streams, via Bluetooth connections, to a target device. Using the example processes described herein, the target device, accurately synchronizes the multiple data streams. In aspects, the target device captures additional data streams and synchronizes data streams captured by both the source device and the target device.

The source device is an audio output device, such as a headset. In one example, the headset has four pairs of stereo microphones positioned to capture eight channels of audio to record a 5.1 surround sound. The target device is a video recording device, such as a smart device (e.g., smartphone, digital camera), in communication with the headset. In an example scenario, the video recording device lacks the 5.1 surround sound recording capabilities and relies on the headset for the audio input. In one aspect, the present disclosure enables accurate synchronization of the surround sound captured by the headset and the video captured by the video recording device, regardless of the significantly increased complexity and volume of data due to multi-channel audio recording instead of mono channel audio recording through Bluetooth connection. Aspects enable capturing up to four high-quality stereo channels of audio by the source device and transmitting them over Bluetooth to the target device. The source device may include a greater number of microphones and/or capture or additional data streams. Aspects also enable dynamic beamforming in a target device, smartphone-based machine learning applications that are used for voice applications or audio perception or sound localization.

Aspects provide methods for generating timestamped audio frames or packets of multiple data streams. The timestamps ensure that, if some audio frames are dropped during transmission over the Bluetooth link from the source device to the target device, the overall audio may be recovered. For example, silence frames, noise frames, or synthesized frames from a nearby microphone channel can be inserted in place of the dropped frames to maintain a continuous global timeline. These "dropped frame recovery" approaches allow a recording to be synchronized with the video into which the audio is embedded. Using the disclosed techniques, high-quality microphones or headphones may be made available to multi-media creators using various software or applications. In aspects, the disclosed techniques utilize the Bluetooth protocol (e.g., Bluetooth Core Specification version 5.2) that allows for other time synchronization methods to be used for sensor data (e.g., multi-channel audio captured using microphones) to be synchronized through isochronous channels.

The present disclosure addressed problems that existed with previous Bluetooth protocols. Traditional Bluetooth protocols have been limited to using mono audio over HFP, preventing more than one audio channel as input. Accordingly, although Bluetooth audio devices, such as headphones, true wireless in-ear (TWIE) devices, and audio eyeglasses ("frames"), have multiple microphones, HFP cannot handle the audio data captured by the multiple microphones. The present disclosure overcomes the mono audio limitation and provides techniques for synchronizing several, or all, of these microphone channels over Bluetooth communication to target devices.

As described in more detail herein, aspects provide a method performed by a source device for acquiring, via a number of sensors, multiple data streams. The source device is an audio output device having multiple microphones and, optionally, other sensors. Timing information is appended for each of the data streams. Data packets of the multiple data streams are formed with the timing information. The data packets are transmitted to a target device that is configured to synchronize the multiple data streams using the timing information.

FIG. 1 illustrates an example system 100 in which aspects of the present disclosure are practiced. As shown, system 100 includes a wearable audio output device 110 (i.e., a source device) communicatively coupled with a portable user device 120 (i.e., a target device).

In an aspect, the headphones 110 include multiple microphones 112 to capture sound signals in multiple channels or streams in the vicinity of the headphones 110. For example, the multiple microphones may include two or more pairs of stereo microphones positioned front and back, on both left and right sides of the headphones 110. Each of the multiple microphones may generate a data stream. The headphones 110 also include at least one acoustic transducer (also known as driver or speaker) for outputting sound. The included acoustic transducer(s) can be configured to transmit audio through air and/or through bone (e.g., via bone conduction, such as through the bones of the skull).

The headphones 110 can further include hardware and circuitry including processor(s)/processing system and memory configured to implement one or more sound management capabilities or other capabilities including, but not limited to, noise cancelling circuitry (not shown) and/or noise masking circuitry (not shown), body movement detecting devices/sensors and circuitry (e.g., one or more accelerometers, one or more gyroscopes, one or more magnetometers, etc.), geolocation circuitry and other sound processing circuitry. The noise cancelling circuitry is configured to reduce unwanted ambient sounds external to the headphones 110 by using active noise cancelling. The noise masking circuitry is configured to reduce distractions by playing masking sounds via the speakers of the headphones 110. The movement detecting circuitry is configured to use devices/sensors such as an accelerometer, gyroscope, magnetometer, or the like to detect whether the user wearing the headphones is moving (e.g., walking, running, in a moving mode of transport etc.); is at rest and/or the direction the user is looking or facing; or if the user is indoors versus outdoors. The movement detecting circuitry can also be configured to detect a head position of the user for use in augmented reality (AR) applications where an AR sound is played back based on a direction of gaze of the user. The geolocation circuitry can be configured to detect a physical location of the user wearing the headphones. For example, the geolocation circuitry includes Global Positioning System (GPS) antenna and related circuitry to determine GPS coordinates of the user.

In an aspect, the headphones 110 include voice activity detection (VAD) circuitry capable of detecting the presence of speech signals (e.g. human speech signals) in a sound signal received by the microphones 112 of the headphones 110. For instance, the microphones 112 of the headphones 110 can receive ambient external sounds in the vicinity of the headphones 110, including speech uttered by the user. The sound signal received by the microphones 112 may have the speech signal mixed in with other sounds in the vicinity of the headphones 110. Using the VAD, the headphones 110 can detect and extract the speech signal from the received sound signal. In an aspect, the VAD circuitry can be used to detect and extract speech uttered by the user in order to facilitate a voice call, voice chat between the user and another person, or voice commands for a virtual personal assistant (VPA), such as a cloud based VPA. In other examples, detections or triggers can include self-VAD (only starting up when the user is speaking, regardless of whether others in the area are speaking), active transport (sounds captured from transportation systems), head gestures, buttons, target device based triggers (e.g. pause/un-pause from the phone), changes with input audio level, audible changes in environment, among others.

In an aspect, the headphones 110 are wirelessly connected to the portable user device 120 using one or more wireless communication methods including, but not limited to, Bluetooth BR/EDR, Wi-Fi, Bluetooth Low Energy (LE), other RF-based techniques, or the like. In an aspect, the headphones 110 include a transceiver that transmits and receives data via one or more antennae in order to exchange audio data and other information with the user device 120.

In an aspect, the headphones 110 include communication circuitry capable of transmitting and receiving audio data and other information from the portable user device 120. The headphones 110 also include an incoming audio buffer, such as a render buffer, that buffers at least a portion of an incoming audio signal (e.g., audio packets) in order to allow time for retransmissions of any missed or dropped data packets from the user device 120. For example, when the headphones 110 receive Bluetooth transmissions from the portable user device 120, the communication circuitry typically buffers at least a portion of the incoming audio data in the render buffer before the audio is actually rendered and output as audio to at least one of the transducers (e.g., audio speakers) of the headphones 110. This is done to ensure that even if there are RF collisions that cause audio packets to be lost during transmission, that there is time for the lost audio packets to be retransmitted by the user device 120 before they have to be rendered by the headphones 110 for output by one or more acoustic transducers (e.g., audio speakers) of the headphones 110.

The audio output device 110 is illustrated as headphones; however, the techniques described herein apply to other wearable audio devices, such as any audio output device that fits around, on, in, or near an ear (including open-ear audio devices worn on the head or shoulders of a user) or other body parts of a user, such as head or neck. The source device 110 may take form as any kind of wearable devices such as headphones, earphones, earpieces, headsets, goggles, headbands, earbuds, armbands, sport headphones, neckband, or eyeglasses.

In an aspect, the headphones 110 can be connected to the portable user device 120 using a wired connection, with or without a corresponding wireless connection. The user device 120 can be a smartphone, a tablet computer, a laptop computer, a digital camera, or other user device that connects with the source device 110. As shown, the user device 120 can be connected to a network 130 (e.g., the Internet) and can access one or more services over the network. As shown, these services can include one or more cloud services 140.

In an aspect, the user device 120 can access a cloud server in the cloud 140 over the network 130 using a mobile web browser or a local software application or "app" executed on the user device 120. In an aspect, the software application or "app" is a local application that is installed and runs locally on the user device 120. In an aspect, a cloud server accessible on the cloud 140 includes one or more cloud applications that are run on the cloud server. The cloud application can be accessed and run by the user device 120. For example, the cloud application can generate web pages that are rendered by the mobile web browser on the user device 120. In an aspect, a mobile software application installed on the user device 120 or a cloud application installed on a cloud server, individually or in combination, may be used to implement the techniques for low latency Bluetooth communication between the user device 120 and the headphones 110 in accordance with aspects of the present disclosure. In an aspect, examples of the local software application and the cloud application include a gaming application, an audio AR application, and/or a gaming application with audio AR capabilities.

The user device 120 may include multiple sensors, such as front-facing or back-facing cameras capable of taking high resolution images or videos. The user device 120 may receive signals (e.g., data and controls) from the headphones 110 and send signals to the headphones 110.

It can be noted that although certain aspects of the present disclosure may discuss low latency Bluetooth communication between a smartphone and headphones for exemplary purposes, any portable user device and any wireless audio output device with similar capabilities can be interchangeably used in these aspects. For instance, a wearable wireless audio output device usable with techniques discussed herein can include over-the-ear headphones, audio eyeglasses or frames, in-ear buds, around-ear audio devices, neck-worn audio devices, or the like. Further, in some aspects, the wireless audio output device need not be wearable, and can more generally be a wireless audio output device including at least one electro-acoustic transducer and at least one wireless module capable of implementing the techniques described herein. For instance, in some such aspects, the wireless audio output device is a speaker or a speaker system. However, as can be understood based on this disclosure, wearable audio devices are used for some implementations, such as those that employ an audio AR application as a trigger for initiating the low latency mode. For ease of description, the wireless audio output device is depicted in the figures and described herein as headphones 110. Similarly, a portable user device usable with techniques discussed herein can include a smart phone, a tablet device, a portable gaming console, a laptop computer, a smart watch, or, generally, any portable or mobile computing device. In any such case, for ease of description, the portable user device is depicted in the figures and described herein as user device 120.

As noted in the above paragraphs, the incoming audio render buffer of a target device 120 receiving a Bluetooth audio stream dominates the end-to-end latency of the Bluetooth audio link. In certain aspects, the overall latency of audio output at the target device 120 is lowered by reducing the size of the render buffer at the source device 110 resulting in less data being buffered before it is rendered and played to the user. However, doing this all the time can result in unacceptably poor RF robustness and lead to excessive audio dropouts in many use cases, especially under challenging RF conditions. For example, where a user is listening to music on headphones 110 via a Bluetooth audio stream while the user device 120 is in the user's pocket, the Bluetooth audio stream may have to travel through the user's body, thereby dictating a relatively large render buffer (e.g., 150 ms or greater) at the headphones 110 to increase audio output robustness and reduce audio dropouts. However, the relatively large render buffer size provides increased audio output latency due to the related delay in playback until the buffer is full.

In certain aspects, a size of the render buffer at a target device can be selectively reduced in order to lower the latency related to audio output at the target device, based on a context of the use case in which the audio streaming is being used. For example, a reduced size of the Bluetooth render buffer is selected in response to detecting certain trigger events relating to use cases utilizing low latency communication of audio data. Thus, in some aspects, the techniques described herein include enabling a low latency mode when it is desired (e.g., in response to a trigger), and disabling the low latency mode at all other times (e.g., in response to removal of the initial trigger or in response to an additional trigger).

Conventional schemes limit the user device 120 to video recording using limited audio signals, such as a single or a pair of audio signals. Additional channels of audio data may be added in post processing, which often requires manual synchronization of existing data on a computing device separate from the user device 120. The present disclosure provides synchronization of multiple data streams during the acquisition of the data streams. In an aspect, the timestamp of the first sample of the audio frame of all the channels is recorded to be compressed and transported. When the compressed audio frames are sent from the headphones 110 to the user device 120, the data streams include the timestamp associated with each audio frame. Each audio frame of each audio channel may be sent individually over the Bluetooth link. The packet containing an audio frame may be prefixed with the channel identifier and the timestamp. In some cases, audio streams from the selected microphone channels are multiplexed with a header that is specific to each audio frame.

The user device 120 receives some or all packets transmitted by the headphones 110 over the radio link (e.g., Bluetooth link). When an audio frame is received, the user device 120 performs the following: (1) demultiplexes the received audio streams; (2) encode recovery packets using the same codec used for respective channels of the audio streams and insert the recovery packets to the audio streams in the place of lost frames or packets; and (3) synchronize the multiple audio streams. For example, either in the process of demultiplexing or in the process of decoding, the timestamp of the received audio frame in that channel may be compared against the timestamp of the last received audio frame in that channel for continuity. If the timestamp in the new, incoming frame does not represent a near continuous timestamp based on the timestamp of the last processed audio frame and the length of the last processed audio frame, then the processor assumes that one or more audio frames in that channel has been lost either over the air or due to insufficient buffering in the headphone. Based on the two timestamps, the number and position of dropped frames can be calculated and recovered.

The dropped frames may be recovered using silence packets, Gaussian noise packets, or synthesized packets based on a prioritized or a neighbor channel. For some codecs, an advantage exists for replacing the lost packets in the decoded stream with silence packets. In some software audio codecs like OPUS CELT, the decoder has the ability to fade out the boundary between a received audio frame N and the synthesized encoded silence frame N+1. Likewise, the received frame N+2 can be faded in at the boundary with the synthesized encoded silence frame N+1. This enables the receiver to hear "pop" free audio at the boundaries of an inserted silence frame and handle the occasional frame drop gracefully. The Gaussian noise packets may be provided at the same temporally local volume level can be inserted in the decoded audio stream. Other dropped frame recovery techniques may be used. With dropped frame recovery, the decoded audio stream is guaranteed to be continuous in the global timeline.

Figure 2A:
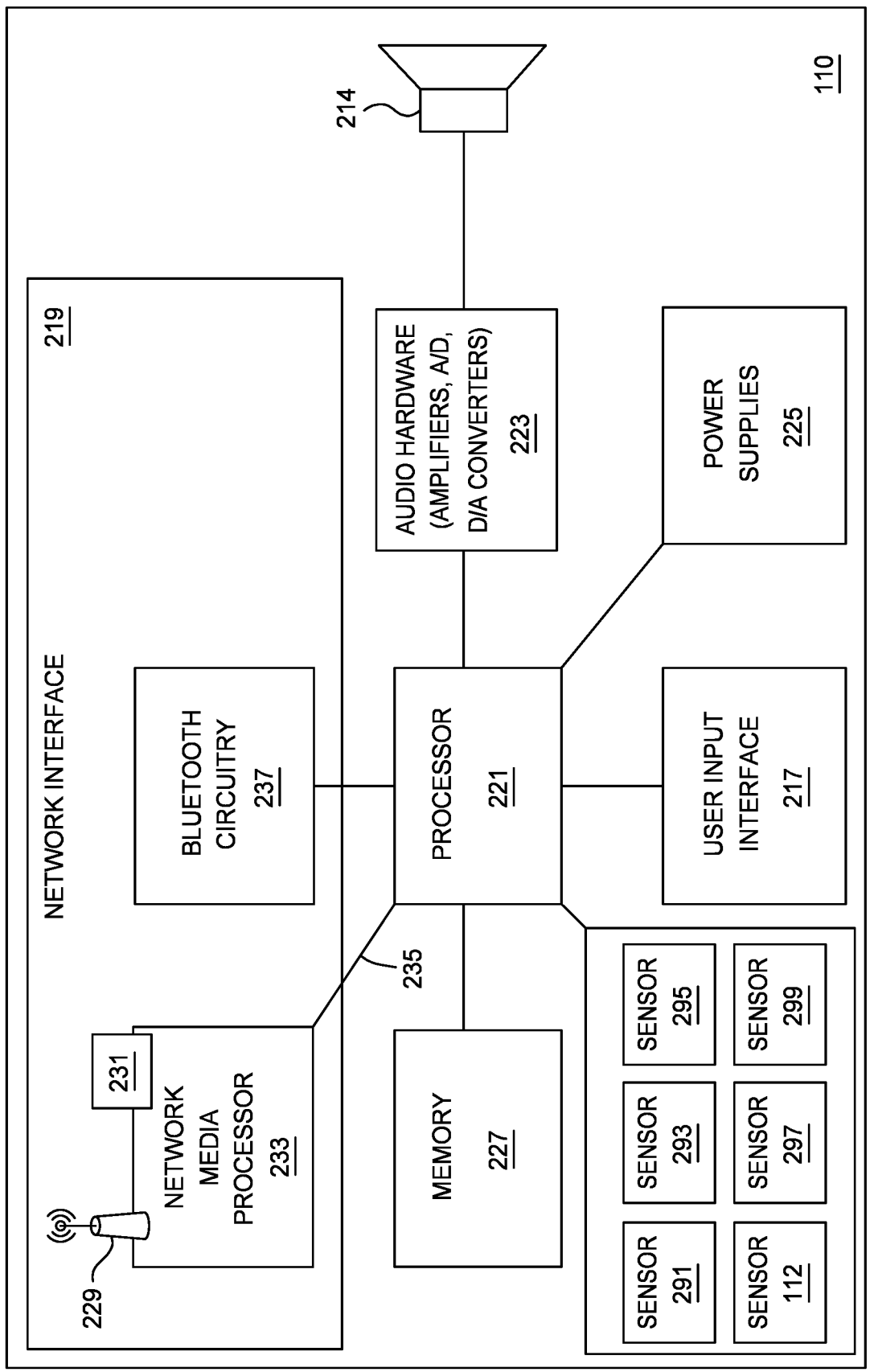
FIG. 2A illustrates an exemplary wireless source device, in accordance with certain aspects of the present disclosure.

FIG. 2A illustrates an exemplary wireless source device 110, such as the headphones 110 illustrated in FIG. 1 or any other wearable audio output device. The wireless source device 110 may include an enclosure. In the enclosure resides an optional graphical interface (e.g., an OLED display) which can provide the user with information regarding currently playing ("Now Playing") music. The source device 110 includes one or more electro-acoustic transducers (or speakers) 214 for outputting audio. The source device 110 also includes a user input interface 217. The user input interface 217 can include a plurality of preset indicators, which can be hardware buttons. The preset indicators can provide the user with easy, one press access to entities assigned to those buttons. The assigned entities can be associated with different ones of the digital audio sources such that a single wireless source device 110 can provide for single press access to various different digital audio sources.

Aspects primarily describe techniques in the context of multiple microphones on a headset for ease of description. Multiple sensors, such as microphones 112, accelerometer 291, gyroscope 293, inertial measurement unit 295, low frequency microphones 297, and/or cameras 299 may be integrated with the source device 110. Other sensors not shown may be used, such as in alternative to or in addition to the sensors shown. For example, one or more magnetometers may be included for sensing relative direction or orientation.

As shown in FIG. 2A, the source device 110 includes an acoustic driver or speaker 214 to transduce audio signals to acoustic energy through the audio hardware 223. The source device 110 also includes a network interface 219, at least one processor 221, audio hardware 223, power supplies 225 for powering the various components of the source device 110, and memory 227. In an aspect, the processor 221, the network interface 219, the audio hardware 223, the power supplies 225, and the memory 227 are interconnected using various buses 235, and several of the components can be mounted on a common motherboard or in other manners as appropriate.

The network interface 219 provides for communication between the wireless source device 110 and other electronic user devices via one or more communications protocols. The network interface 219 provides either or both of a wireless network interface 229 and a wired interface 231 (optional). The wireless interface 229 allows the wireless source device 110 to communicate wirelessly with other devices in accordance with a wireless communication protocol such as IEEE 802.11. The wired interface 231 provides network interface functions via a wired (e.g., Ethernet) connection for reliability and fast transfer rate, for example, used when the source device 110 is not worn by a user. Although illustrated, the wired interface 231, is optional.

In certain aspects, the network interface 219 includes a network media processor 233 for supporting Apple AirPlay® and/or Apple Airplay® 2. For example, if a user connects an AirPlay® or Apple Airplay® 2 enabled device, such as an iPhone or iPad device, to the network, the user can then stream music to the network connected audio playback devices via Apple AirPlay® or Apple Airplay® 2. Notably, the audio playback device can support audio-streaming via AirPlay®, Apple Airplay® 2 and/or DLNA's UPnP protocols, and all integrated within one device.

All other digital audio received as part of network packets may straight from the network media processor 233 through a USB bridge (not shown) to the processor 221 and runs into the decoders, DSP, and eventually is played back (rendered) via the electro-acoustic transducer(s) 214. Although the source device 110 is illustrated as a headset having the electro-acoustic transducer(s) 214, it should be understood that the source device 110 may take on a different form of wearable device, such as a goggle or headband having the sensors 112, 291, 293, 295, 297, and 299 without the audio hardware 223 or electro-acoustic transducer(s) 214.

The network interface 219 can further include a Bluetooth circuitry 237 for Bluetooth applications (e.g., for wireless communication with a Bluetooth enabled audio source such as a smartphone or tablet) or other Bluetooth enabled speaker packages. In some aspects, the Bluetooth circuitry 237 may be the primary network interface 219 due to energy constraints. For example, the network interface 219 may use the Bluetooth circuitry 237 solely for mobile applications when the source device 110 adopts any wearable form. For example, Bluetooth LE technologies may be used in the source device 110 to extend battery life, reduce package weight, and provide high quality performance without other backup or alternative network interfaces.

In an aspect, the network interface 219 supports communication with other devices using multiple communication protocols simultaneously at one time. For instance, the source device 110 can support Wi-Fi/Bluetooth coexistence and can support simultaneous communication using both Wi-Fi and Bluetooth protocols at one time. For example, the source device 110 can receive an audio stream from a smart phone using Bluetooth and can further simultaneously redistribute the audio stream to one or more other devices over Wi-Fi. In an aspect, like most commercially available speaker packages, network interface 219 can include only one Radio Frequency (RF) Chain capable of communicating using only one communication method (e.g., Wi-Fi or Bluetooth) at one time. In this context, the network interface 219 may simultaneously support Wi-Fi and Bluetooth communications by time sharing the single RF chain between Wi-Fi and Bluetooth, for example, according to a time division multiplexing (TDM) pattern.

Streamed data may pass from the network interface 219 to the processor 221. The processor 221 can execute instructions (e.g., for performing, among other things, digital signal processing, decoding, and equalization functions), including instructions stored in the memory 227. The processor 221 can be implemented as a chipset of chips that includes separate and multiple analog and digital processors. The processor 221 can provide, for example, for coordination of other components of the audio source device 110, such as control of user interfaces.

In certain aspects, the memory 227 stores software/firmware related to protocols and versions thereof used by the source device 110 for communicating with other networked devices. For example, the software/firmware governs how the source device 110 communicates with other devices for synchronized playback of audio. In an aspect, the software/firmware includes lower level frame protocols related to control path management and audio path management. The protocols related to control path management generally include protocols used for exchanging messages between speakers. The protocols related to audio path management generally include protocols used for clock synchronization, audio distribution/frame synchronization, audio decoder/time alignment and playback of an audio stream. In an aspect, the memory can also store various codecs supported by the speaker package for audio playback of respective media formats. In an aspect, the software/firmware stored in the memory can be accessible and executable by the processor 222 for synchronized playback of audio with other networked speaker packages.

In certain aspects, the protocols stored in the memory 227 may include Bluetooth LE according to, for example, the Bluetooth Core Specification version 5.2 (BT5.2). The source device 110 and the various components therein are provided herein to sufficiently comply with or perform aspects of the protocols and the associated specifications. For example, BT5.2 includes enhanced attribute protocol (EATT) that supports concurrent transactions. A new L2CAP mode is defined to support EATT. As such, the source device 110 includes hardware and software components sufficiently to support the specifications and modes of operations of BT5.2, even if not expressly illustrated or discussed in this disclosure. For example, the source device 110 may utilize LE Isochronous Channels specified in BT5.2. In addition, the source device 110 performs additional and/or different data processing or rendering to the multiple data streams acquired by the multiple sensors 112 according to aspects disclosed herein.

The processor 221 provides a processed digital audio signal to the audio hardware 223 which includes one or more digital-to-analog (D/A) converters for converting the digital audio signal to an analog audio signal. The audio hardware 223 also includes one or more amplifiers which provide amplified analog audio signals to the electroacoustic transducer(s) 214 for sound output. In addition, the audio hardware 223 can include circuitry for processing analog input signals to provide digital audio signals for sharing with other devices, for example, other speaker packages for synchronized output of the digital audio.

The memory 227 can include, for example, flash memory and/or non-volatile random access memory (NVRAM). In some implementations, instructions (e.g., software) are stored in an information carrier. The instructions, when executed by one or more processing devices (e.g., the processor 221), perform one or more processes, such as those described elsewhere herein. The instructions can also be stored by one or more storage devices, such as one or more computer or machine-readable mediums (for example, the memory 227, or memory on the processor). The instructions can include instructions for performing decoding (i.e., the software modules include the audio codecs for decoding the digital audio streams), as well as digital signal processing and equalization.

In certain aspects, the memory 227 and the processor 221 may collaborate in data acquisition and real time processing with the sensors 112, 291, 293, 295, 297, and/or 299. For example, the sensors may include at least one of a microphone, camera, accelerometer, magnetometer, gyroscope, or inertial measurement unit. In one implementations, the sensors 112 may include multiple microphones, such as six or more microphones positioned and oriented to capture a 5.1 surround sound. For example, the 5.1 surround sound may include a front left, front right, center, low-frequency effects, surround left, and surround right channels. The sensors 112 may include a microphone corresponding to each of the multiple surround sound channels. In some cases, the sensors 112 may use the memory 227 as a buffer or include onboard buffer memories.

Figure 3:
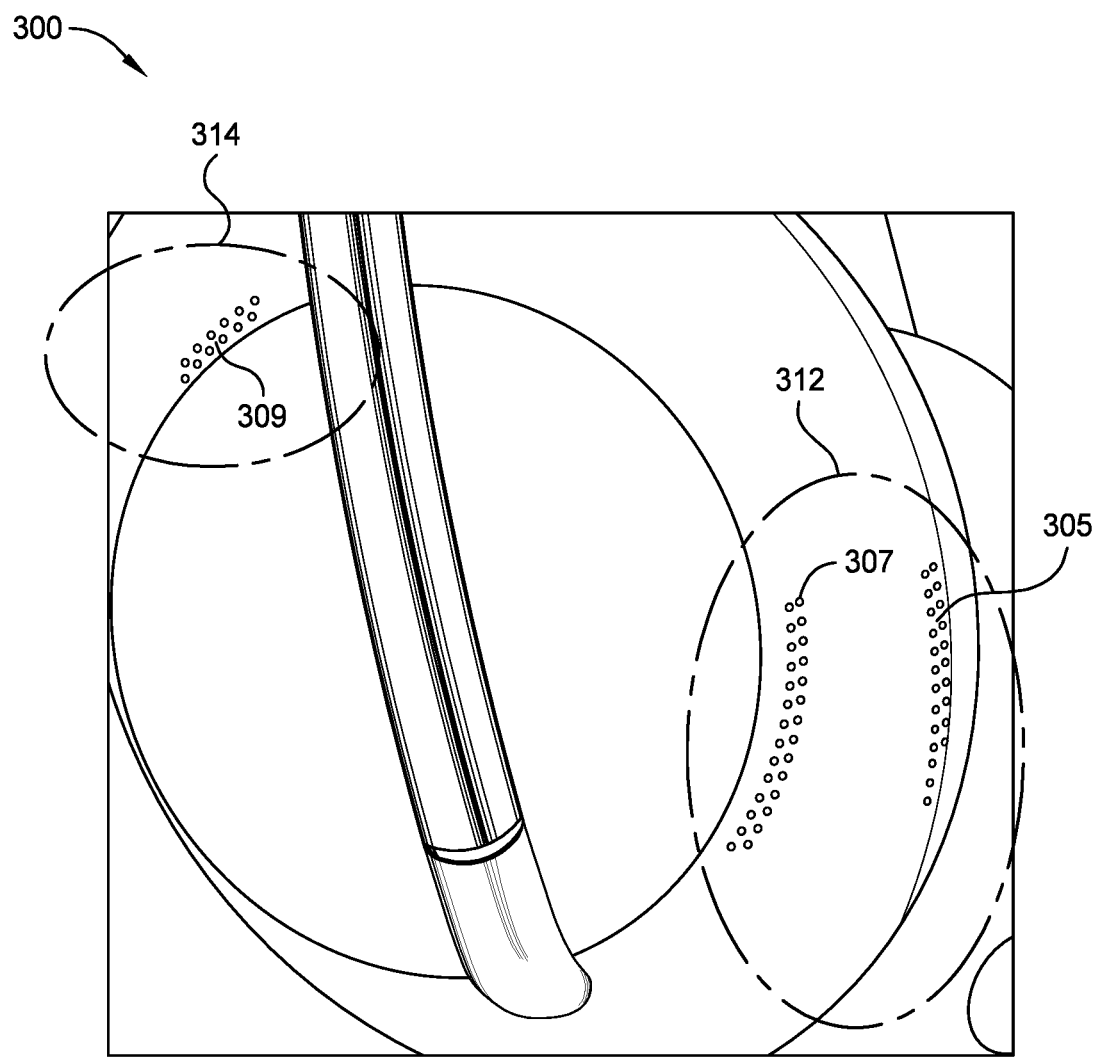
FIG. 3 illustrates an exemplary wireless source device having multiple sensors for capturing a surround sound experience, in accordance with certain aspects of the present disclosure.

During operation, one or more of the sensors 112 and 291-299 generate or produce multiple data streams as they acquire or capture data. The processor 221 appends timing information for each of the data streams. The processor 221 forms data packets of the multiple data streams with the timing information. For example, the timing information is appended to each data stream before or after forming the data packets. In one example, the multiple data streams are multiplexed first and the timing information is appended to each of the output packets. The timing information includes a timestamp that identifies a shared time instance of a subset of the multiple data streams. In aspects, the timestamp is one micro second. In yet other aspects, the timestamp is of another duration that sufficiently identifies a common instance in time of the multiple data streams. The formed data packets may further include an identification of the original data stream. Although the sensors 112 are described as having six microphones, in some aspects, the sensors 112 may have more microphones, such as eight, or less microphones, such as four, depending on specific application. FIG. 3 provides one example configuration of the sensors 112 and is further discussed below.

Figure 2B:
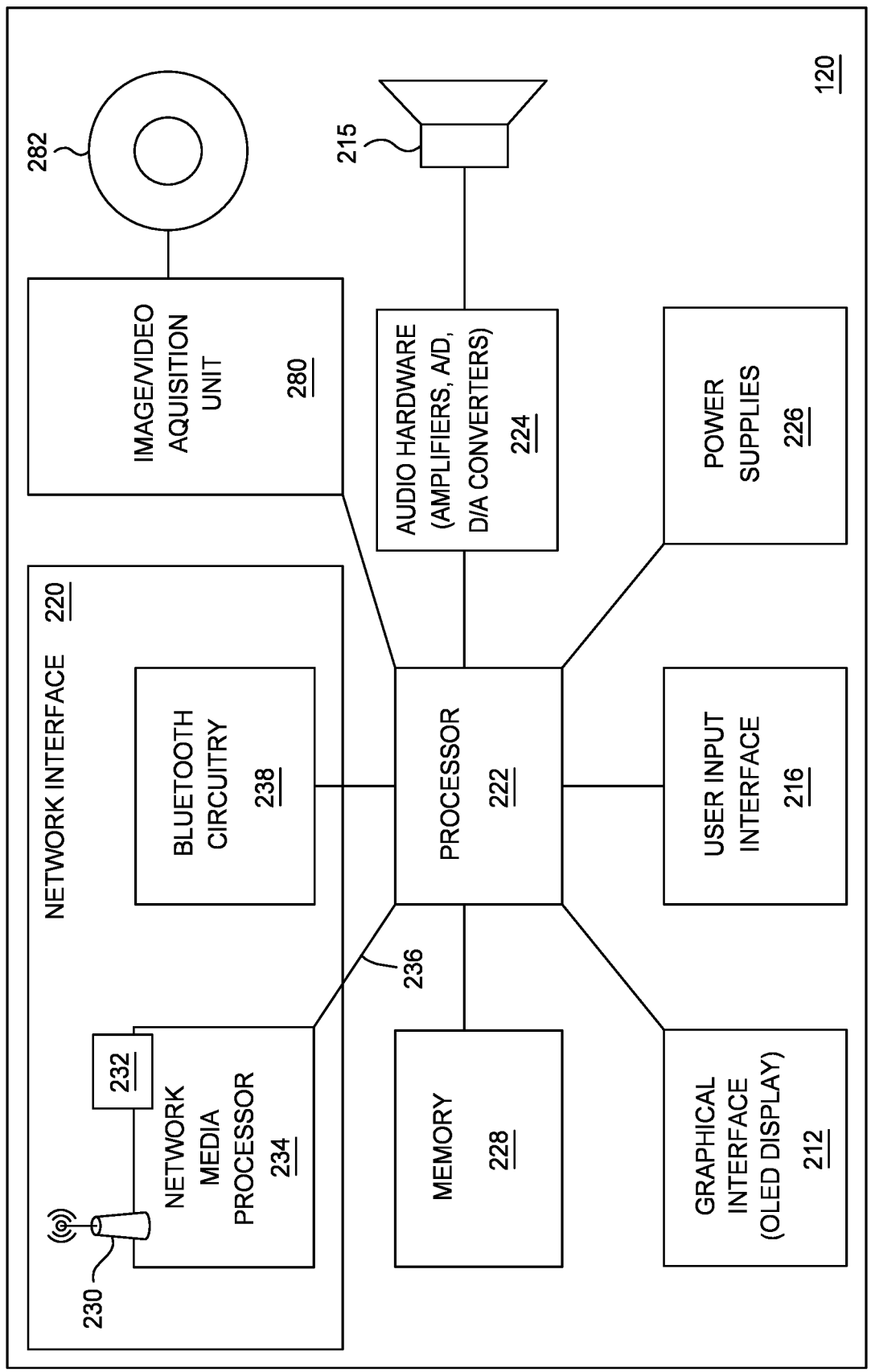
FIG. 2B illustrates an exemplary wireless target device, in accordance with certain aspects of the present disclosure.

FIG. 2B illustrates an exemplary wireless target device 120 such as the user device 120 illustrated in FIG. 1, in accordance with certain aspects of the present disclosure. The wireless target device 120 may include an enclosure that resides an optional graphical interface 212 (e.g., an OLED display), which provides the user with information regarding currently playing ("Now Playing") music or video. The target device 120 includes one or more electro-acoustic transducers 215 for outputting audio. The target device 120 may also include a user input interface 216 that enables user input.

Target device 120 also includes a network interface 220, at least one processor 222, audio hardware 224, power supplies 226 for powering the various components of the target device 120, and a memory 228. In an aspect, the processor 222, the graphical interface 212, the network interface 220, the audio hardware 224, the power supplies 226, and the memory 228 are interconnected using various buses 236, and several of the components can be mounted on a common motherboard or in other manners as appropriate. In some aspects, the processor 222 of the target device 120 is more powerful in terms of computation capacity than the processor 221 of the source device 110. Such difference may be due to constraints of weight, power supplies, and other requirements. Similarly, the power supplies 226 of the target device 120 may be of a greater capacity and heavier than the power supplies 225 of the source device 110.

The network interface 220 provides for communication between the wireless target device 120 and the source device 110, as well as other or additional audio sources and other wireless speaker packages including one or more networked wireless speaker packages and other audio playback devices via one or more communications protocols. The network interface 220 can provide either or both of a wireless interface 230 and a wired interface 232 (optional). The wireless interface 230 allows the wireless target device 120 to communicate wirelessly with other devices in accordance with a wireless communication protocol such as IEEE 802.11. The wired interface 232 provides network interface functions via a wired (e.g., Ethernet) connection.

In certain aspects, the network interface 220 can also include a network media processor 234 and Bluetooth circuitry 328, similar to the network medial processor 233 and Bluetooth circuitry 238 in the source device 110 in FIG. 2A. Further, in aspects, the network interface 220 supports communication with other devices using multiple communication protocols simultaneously at one time, as described with respect to the network interface 219 in FIG. 2A.

All other digital audio received as part of network packets comes straight from the network media processor 234 through a USB bridge 236 to the processor 222 and runs into the decoders, DSP, and eventually is played back (rendered) via the electro-acoustic transducer(s) 215.

The target device 120 may also include an image or video acquisition unit 280 for capturing image or video data. For example, the image or video acquisition unit 280 may be connected to one or more cameras 282 and able to capture still or motion images. The image or video acquisition unit 280 may operate at various resolutions or frame rates according to a user selection. For example, the image or video acquisition unit 280 may capture 4K videos (e.g., a resolution of 3840 by 2160 pixels) with the one or more cameras 282 at 30 frames per second, FHD videos (e.g., a resolution of 1920 by 1080 pixels) at 60 frames per second, or a slow motion video at a lower resolution, depending on hardware capabilities of the one or more cameras 282 and the user input. The one or more cameras 282 may include two or more individual camera units having respective lenses of different properties, such as focal length resulting in different fields of views. The image or video acquisition unit 280 may switch between the two or more individual camera units of the cameras 282 during a continuous recording.

Data streams, such as the acquired data from the source device 110, may pass from the network interface 220 to the processor 222. The processor 222 executes instructions within the wireless speaker package (e.g., for performing, among other things, digital signal processing, decoding, and equalization functions), including instructions stored in the memory 228. The processor 222 can be implemented as a chipset of chips that includes separate and multiple analog and digital processors. The processor 222 can provide, for example, for coordination of other components of the audio target device 120, such as control of user interfaces and applications.

During operation, the processor 222 receives, from the source device 110, data packets associated with the multiple data streams acquired by one or more of the sensors 112 and 291-299. The processor 222 decodes the data streams based on the received data packets. For example, the processor demultiplexes the data packets. The processor 222 extracts timing information associated with the data packets and uses the timing information to synchronize the multiple data streams. In some cases, the processor 222 produces a synchronized audio file. In other cases, the processor 222 processes the captured video data from the image or video acquisition unit 280 together with the multiple data streams from the source device 110 and generates a movie having surround sound properties. Different implementations may be based on different sensor types recorded by the various sensors in the source device 110 as well as the target device 120.

In certain aspects, the memory 228 stores software/firmware related to protocols and versions thereof used by the target device 120 for communicating with other networked devices. For example the software/firmware governs how the target device 120 communicates with other devices for synchronized playback of audio. In an aspect, the software/firmware includes lower level frame protocols related to control path management and audio path management. The protocols related to control path management generally include protocols used for exchanging messages between speakers. The protocols related to audio path management generally include protocols used for clock synchronization, audio distribution/frame synchronization, audio decoder/time alignment and playback of an audio stream. In an aspect, the memory stores various codecs supported by the speaker package for audio playback of respective media formats. In an aspect, the software/firmware stored in the memory is accessible and executable by the processor 222 for synchronized playback of audio with other networked speaker packages.

The processor 222 provides a processed digital audio signal to the audio hardware 224 similar to the processor 221 described in FIG. 2A.

The memory 228 can include, for example, flash memory and/or non-volatile random access memory (NVRAM). In aspects, instructions (e.g., software) are stored in an information carrier. The instructions, when executed by one or more processing devices (e.g., the processor 222), perform one or more processes, such as those described herein. The instructions can also be stored by one or more storage devices, such as one or more computer or machine-readable mediums (for example, the memory 228, or memory on the processor 222). The instructions can include instructions for performing decoding (i.e., the software modules include the audio codecs for decoding the digital audio streams), as well as digital signal processing and equalization.

Example Multi-Channel Sensor Data Capture with Dropped Frame Recovery

Although FIG. 2A provides abilities of the source device 110 to capture multiple data streams of various types using different sensors, an example of multi-channel microphone data capture is used herein to provide an example illustration of the present disclosure. High-quality audio signal measurements depend on directional configurations and provide various challenges to existing wireless systems for synchronization. The example of multi-channel microphone data capture described below illustrates some advantages of the present disclosure.

FIG. 3 illustrates an exemplary wireless source device 110 having multiple sensors 112 for capturing a surround sound experience. As shown, the wireless source device 110 takes on a form of a headset 300 having at least a pair of ear cups with built-in speakers and multiple microphones positioned at different locations and oriented toward different directions. For example, each ear cup of the headset 300 includes a front sensor group 312 and a rear sensor group 314 on each ear cup. The front sensor group 312 includes a front facing microphone 305 and a side facing microphone 307 on each earcup. The rear sensor group 314 includes a rear facing microphone 309 on each earcup. The illustrated three pairs (i.e., six in total) of microphones 305, 307, and 309 are positioned to capture a surround sound, such as a 5.1 surround sound. For example, from a listener's perspective, the 5.1 surround sound includes audio sources from a front center direction, a front left direction about 30 degrees from the front center direction, a symmetrical front right direction about 30 degrees from the front center direction, a surround (e.g., rear) left direction about 110 degrees from the front center direction, and a symmetrical surround right direction about 110 degrees from the front center direction. The three pairs of microphones 305, 307, and 309 may be configured to individually capture audio signals from each direction, or configured to identify audio signals from each direction in a coordinated manner (e.g., via post processing).

In certain aspects, certain channels or data streams of the three pairs of microphones 305, 307, and 309 may be prioritized. For example, the side facing microphones 307 may be prioritized such that signals from the front facing microphones 305, if impaired, blocked, or otherwise unavailable, may be interpolated, extrapolated, or otherwise derived from the prioritized channels. In certain aspects, each ear cup may further include an additional internal microphone, to capture two additional data streams. The internal microphones may be used to capture, baseline, noise, interference, or reference information that help post-processing the surround sound. Eight microphones may fully capture a surround sound suitable for various standards, including Dolby Digital, Dolby Stereo, Dolby Pro Logic II, Digital Theater Systems (DTS), Sony Dynamic Digital Sound (SDDS), and THX (or THX certifiable), among others. In aspects, more or fewer microphones can be used.

Figure 4:
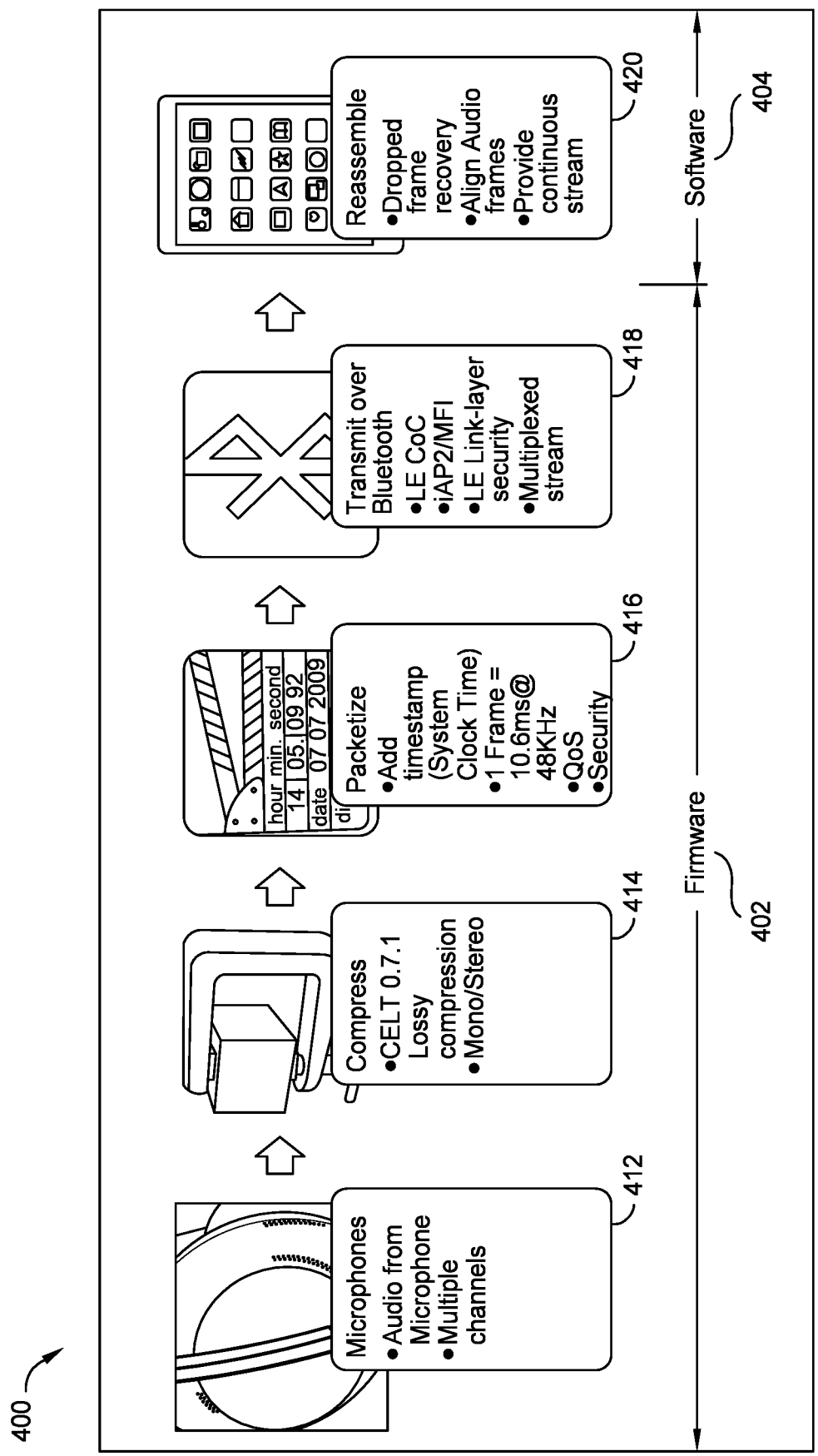
FIG. 4 illustrates an exemplary process to produce a synchronized surround sound audio, in accordance with certain aspects of the present disclosure.

FIG. 4 illustrates an exemplary process flow 400 to produce a synchronized surround sound audio. In general, the process flow 400 includes two stages: the firmware stage 402 performed by the source device and the software (i.e., application) stage 404 performed by the target device side. As shown, at 412, the various sensors/microphones 112 of the source device 110 capture or acquire multiple data streams. Each data stream may correspond to a data channel of each microphone. Therefore, the three pairs of microphones 305, 307, and 309 as shown in FIG. 3 may include six data streams in total. At 414, the data streams are compressed using a codec, such as, for example, the CELT 0.7.1 Lossy compression codec. In aspects, a different codec is used to meet quality and/or bandwidth requirements.

At 416, the data streams are packetized for Bluetooth (e.g., Bluetooth LE) or wireless transmission. A timestamp, such as a system clock time, may be added to each packet (or frame) of the packetized data streams. For example, at a sampling rate of 48 kHz, each packet or frame corresponds to a duration of 10.6 ms. A corresponding system time may be appended to each packet. Furthermore, each packet includes an identifier specifying which of the multiple channels or sensors the packet belongs to. In some aspects, the packets formed at 416 further include quality of service (QoS) information and security mechanisms.

At 418, the packetized data streams are transmitted via Bluetooth from the source device 110 to the target device 120. In some aspects, the transmission uses a low energy logical link control and adaptation layer protocol (L2CAP CoC). Other aspects may include adding LE link-layer security to the transmission. The packetized data streams may be multiplexed prior to transmission. In some aspects, The Bluetooth profile may use LE Audio according to the Bluetooth Core Specification version 5.2 standard and employ an LE Audio codec, such as the low complexity communications codec (LC3) for encoding and decoding the packetized data stream.

In the software stage 404, the target device 120 performs one or more processes on the received data streams. For example, at 420, the target device 120 demultiplexes the multiplexed data streams upon receipt. Some packets may be dropped during transmission. The target device 120 performs dropped frame recovery to the received data streams. Because each packet carries a timestamp and a channel identifier, the target device 120 can identify missing packets. Specifically, the target device 120 identifies missing packets for each data stream per time period. The target device 120 then uses various recovery mechanisms to provide a continuous data stream for all received data streams. Furthermore, the target device 120 uses the timestamps of the data packets to align or synchronize all of the data streams to produce a multi-channel audio file that has synchronized and continuous audio streams.

Figure 5:
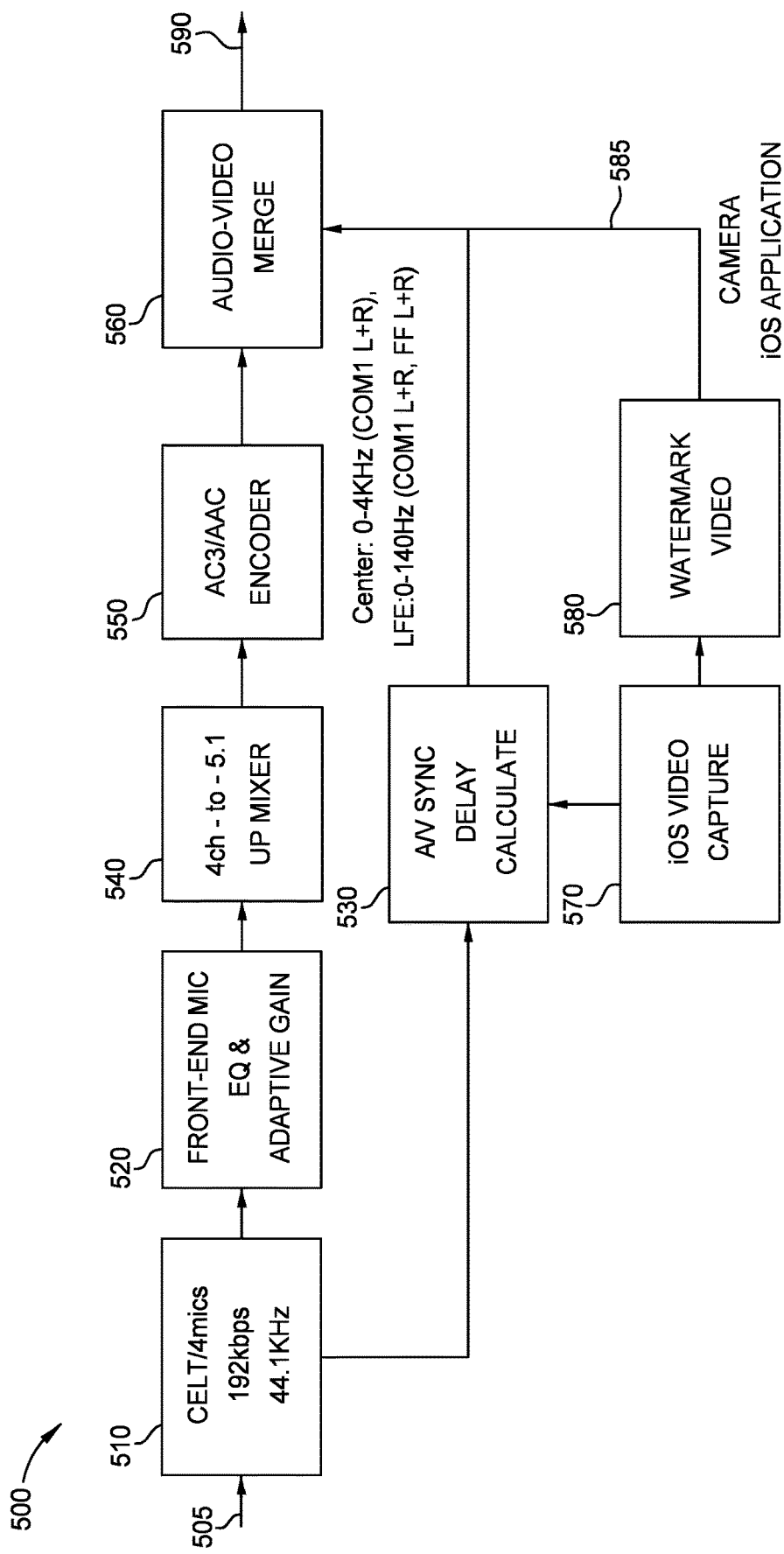
FIG. 5 illustrates an example block diagram of different stages of data processing, in accordance with certain aspects of the present disclosure.

FIG. 5 illustrates an example block diagram 500 of different stages of data processing. The block diagram 500 illustrates various codecs, convertors, and other data processing modules used in an example scenario. The input 505 includes multiple data streams acquired by the source device 110.

As shown, at 510, a four-microphone configuration is used to capture four data streams at 192 kbps at 44.1 kHz. The data streams are compressed using CELT. The data streams are delivered to both a post processing module that performs frontend microphone equalization and adaptive gain calculation at 520, and an audio/video synchronization delay calculation module at 530.

At 540, a four channel to 5.1 surround sound mixer converts the audio format. At 550, the converted 5.1 surround sound is encoded using a suitable encoder such as an AC3 or AAC encoder. At 560, an audio-video processor merges the encoded 5.1 surround sound with videos captured based on synchronization calculated at 530. The video may be captured at 570 via a target device. In aspects, the captured video is watermarked at 580 before merging with the 5.1 surround sound at 560. In some cases, the watermark video is provided by a proprietary application 585 running on the target device. At 590, as a result of the data processing a video having 5.1 surround sound that is synchronized to a video clip captured at the target device is generated.

Figure 6:
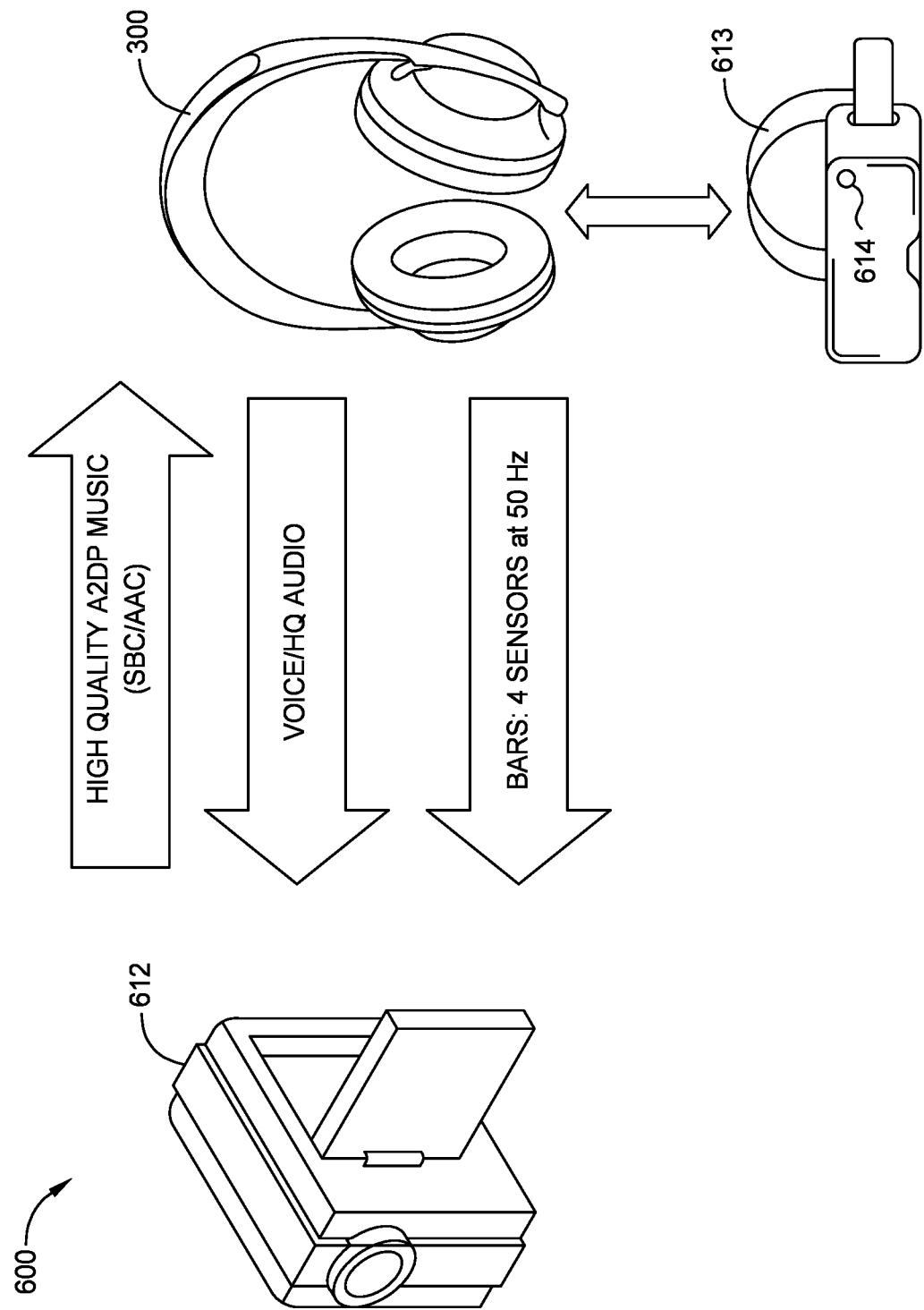
FIG. 6 illustrates an example communication between a source device and a target device, in accordance with certain aspects of the present disclosure.

FIG. 6 illustrates an example communication 600 between a source device 300 and a target device 612. In this example, the target device 612 is a digital camera or camcorder, which may capture audio in mono or stereo mode. The source device 300 uses multiple microphones 112 to capture high-quality multi-channel audio and provide the audio to the target device 612, such that the target device 612 may compose a video with synchronized surround sound audio. For example, the source device 300 may use four microphones and transmits four channels of audio data continuously to the target device 612. The target device 612 records a video and combines the received four-channel audio streams with the recorded video. The audio and video is synchronized using the example process shown in FIG. 5. The wireless connection between the source device 300 and the target device 612 enable simultaneous transmission of high quality audio data from the target device 612 to the source device 300.

In some aspects, the source device 300 are audio frames such as an augmented reality goggle or a virtual reality goggle. The frames 613 may include a number of sensors 614, which may include an accelerometer, a gyroscope, an inertial measurement unit, a camera, a thermometer, or other sensors. For example, the frames 613 may be worn by a user test driving a vehicle having the target device 612 onboard the vehicle. As such, the target device 612 receives various acceleration data streams from the frame 613, and produces a video having the driving experience data synchronized to the video captured by the target device 612. The multiple data streams, along with the video captured, may be used for simulation that reproduced the captured accelerations and other data streams. FIG. 6 illustrates and describes the use of a headset 300 and frames 613 to explain examples of how multiple data streams transmitted via Bluetooth may be synchronized; however other applications of synchronization of multiple wireless data are possible and not limited by the present enumeration of examples.

Figure 7:
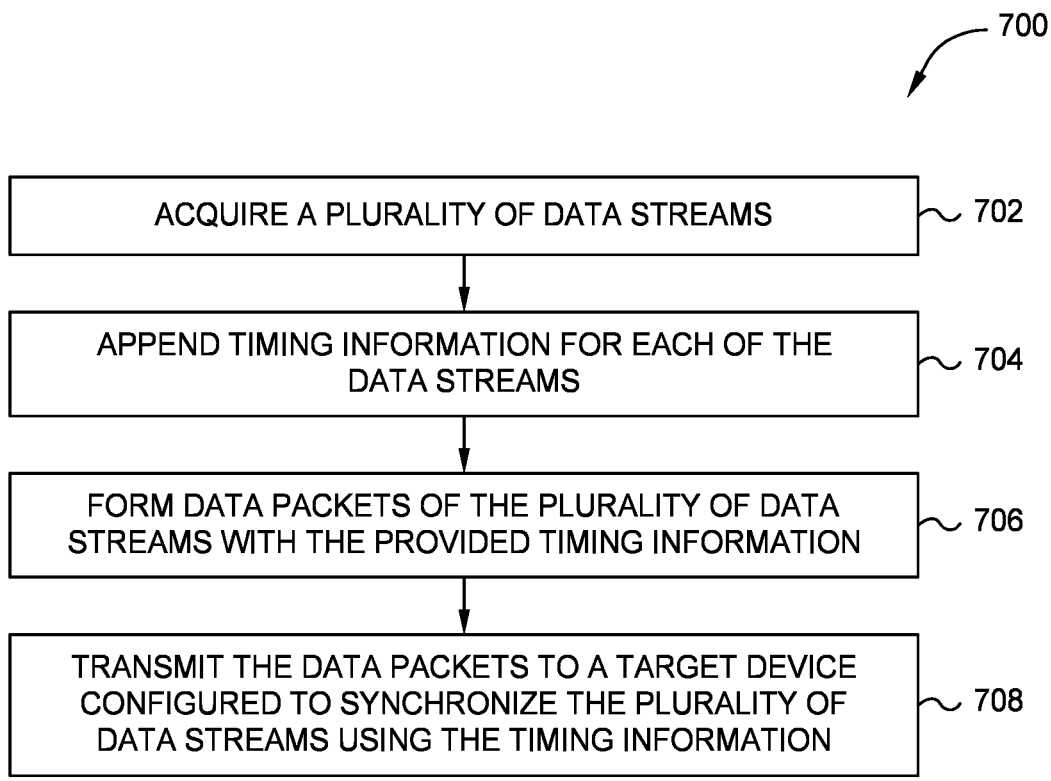
FIG. 7 is a flow diagram illustrating example operations that may be performed by a source device, in accordance with certain aspects of the present disclosure.

FIG. 7 is a flow diagram illustrating example operations 700 that may be performed by a source device. For example, the example operations 700 may be performed by the source device 110 of FIG. 1 or FIG. 2A when acquiring and transmitting multiple data streams via BLE to the target device 120.

The example operations 700 begin, at 702, by acquiring, via multiple sensors, a number of data streams. The data streams may correspond to multiple channels of audio data captured by multiple microphones for recording a surround sound, in some examples. At 704, timing information may be appended to each of the data streams. In some cases, the timing information may include timestamps generated for each frame of each data stream for synchronization purposes. In other examples, the timing information may relate to time slot provided by an initiator or master device. At 706, data packets of the multiple data streams may be formed with the timing information. For example, the data streams may be multiplexed and packetized for wireless transmission. Each packet may include a source or channel identifier as well as the timing information, both of which may be used by the target device to reassemble or reconstruct the data streams in a synchronized manner. At 708, the data packets are transmitted to a target device configured to synchronize the multiple data streams using the timing information.

In some aspects, the timing information may include a timestamp for each data packet of the plurality of data streams. The unit of the timestamp may be one microsecond in some instance and may be defined in other instances by a timescale in order to conserve bits used for representing the timestamp. The timestamp may identify a shared time instance of a subset of the multiple data streams. In some cases, the subset of the multiple data streams and each data packet of the plurality of data streams have a same time duration. In other cases, the data streams may have different length in terms of bytes or duration when the sampling rates, bits per sample, or tolerance to losing data packets are different.

In some aspects, instead of a timestamp, a time slot may be provided by an initiator device, for example, when an isochronous channel is used according to certain Bluetooth specifications. The time slot may be assigned to each of the multiple data streams. For example, the low energy (LE) audio protocol according to Bluetooth Core Specification version 5.2 may be used, such as LE Audio. An initiator device may broadcast and/or negotiate a time slot with an acceptor device. A unicast or peer-to-peer configuration may be used.

In some aspects, the data packets may be transmitted in separate channels. Each of the channels associated with at least one sensor configured to capture one of the plurality of data streams. In some cases, the data packets may be multiplexed before being transmitted in the separate channels. For example, instead of multiplexing audio frames from channels into a single stream at the application layer, when some Bluetooth host stacks and transports like LE CoC may support multiple channels, each channel or audio stream can be sent in its own L2CAP channel. The applicability of the separate-channel scheme depends on the number of channels supported by the Bluetooth host stack and its ability to provide memory for sending each channel separately. Using multiplexing or separate channels may depend on the content of transmission, as multiplexing the data streams adds another security mechanism and increases decoding difficulties.

Relatedly, the choice of the software audio codec is important. The software audio codec needs be capable of compressing a single mic stream in mono mode and two stereo mics in stereo or joint stereo mode. When the software audio codec is operated in stereo or joint stereo mode, it is best if two microphones feeding into this encoder instance are selected one from the left-side of the headphone/truly wireless earbud or earhook device/frames and the other from the right-side of the headphone/truly wireless earbud or earhook device/frames.

The disclosed processes may, in some preferred examples, be used with software audio codecs with high compression ratios like OPUS, CELT, etc. For example, when using CELT, mono modes with bit rates of 12 kbps per mono mic to 64 kbps per mono mic and stereo modes with bit rates of 24 kbps per stereo pair to 128 kbps per stereo pair are suitable bit rates for different applications that can be supported. Multimedia applications would want to use CELT with at least 96 kbps for a stereo pair. When using CELT, speech and voice applications would work optimally between bit rates of 24 kbps per stereo pair and 48 kbps per stereo pair.

To make use of the available bandwidth, multiple frames each along with its own header may have to be packed into a single MTU at the application layer and sent across the Bluetooth link in order to be able to use the bandwidth efficiently. The optimal number of frames to pack will depend upon the configuration of the bit rates and the number of audio streams to transport.

Robust transmission of voice when bandwidth is available. Since radio conditions and temporal variations in radio performance affect the robustness, the source device may buffer some amount of audio frames. Although deep buffers result in increasing jitter and maximum latency, it adds robustness to the system. For excellent robustness against random radio events, the application should ensure that the sum of the steady-state bandwidth requirements and the bandwidth required to transmit the high watermark of the buffer in the device within the time duration that it represents is less than 80% of the available bandwidth in the Bluetooth transport.

The data streams may be transmitted over any transports in Bluetooth. Each transport may have characteristics that impose limitations: LE-CoC (Bluetooth LE based Connection Oriented Channels), GATT/LE (GATT over LE), GATT/BR/EDR (GATT over Bluetooth BR/EDR), SPP (Serial Port Protocol over Bluetooth BR/EDR) or RFCOMM based proprietary protocols. These Bluetooth transport protocols are reliable from a radio communication perspective. By using a deep enough buffer and planning the bit-rate of the audio stream for the application based on the available bandwidth over the chosen transport, multiple mic channels can be transmitted. Alternative transports can be used to transmit data streams such as LE isochronous channels, which provides good performance for radio communication and supports multi-channel data streams.

Various processing sequences are possible. For example, the various sensors on the source device may first acquire multiple data streams. The data streams may then be compressed and packetized. Timestamps are appended to the data packets. The data packets carrying timestamp and channel information may then be multiplexed and transmitted. The target device, upon receiving the data packets, may demultiplex the packets and synchronize the data streams using the timestamps. In another example, compression may occur after forming the data packets and having appended the timestamps thereto. The compressed data packets may then be multiplexed and transmitted. In yet another example, the data streams may be packetized for each data stream. Each packet is then timestamped and transmitted in separate channels to the target device and does not require multiplexing. Other sequence configurations of data compression and transmission are possible.

Figure 8:
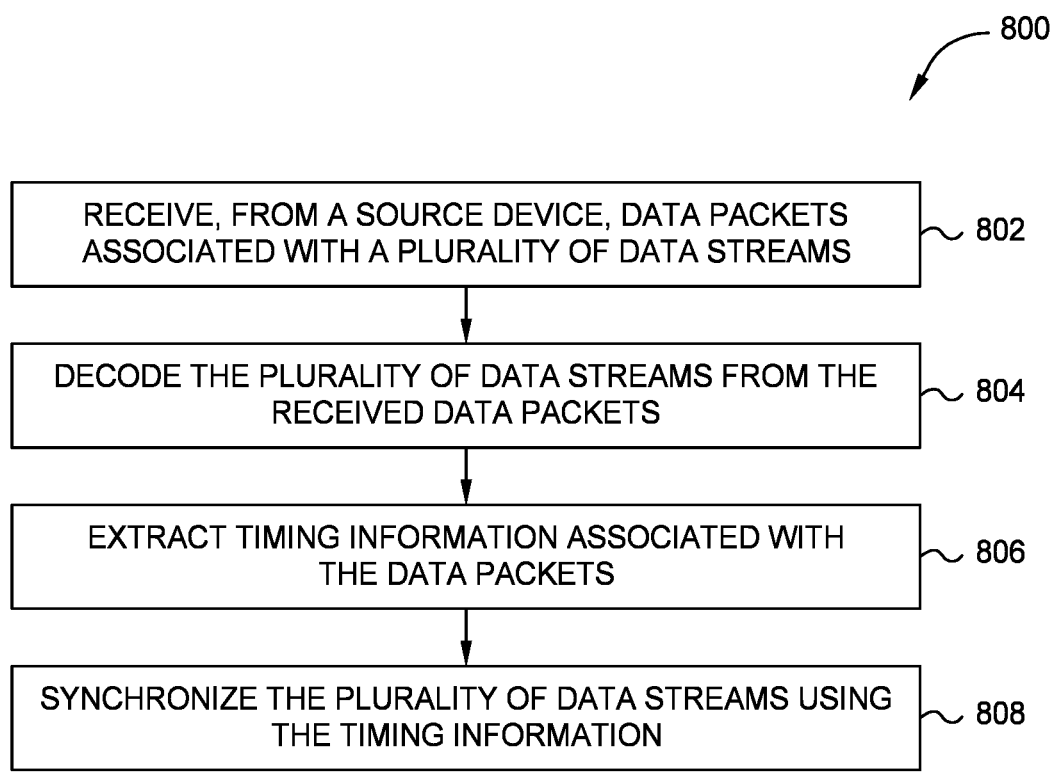
FIG. 8 is a flow diagram illustrating example operations that may be performed by a target device, in accordance with certain aspects of the present disclosure.

FIG. 8 is a flow diagram illustrating example operations 800 that may be performed by a target device. For example, the example operations 800 may be performed by the target device 120 of FIG. 1 or FIG. 2B when receiving the multiple data streams via BLE from the source device 120.

The example operations 800 begin, at 802, by receiving, from a source device, data packets associated with multiple data streams acquired via a number of sensors. For example, the data streams may include multiple audio channels of data. As mentioned, the data streams may be packetized and compressed in different manners. At 804, the data streams may be decoded from the received data packets, for example demultiplexed or decompressed using a corresponding codec. At 806, timing information associated with the data packets may be extracted. The timing information may be timestamps of the data packets at each frame. At 808, the multiple data streams may be synchronized using the timing information.

In some cases, as the target device may take on the form as a smartphone, a user interface may be provided. The user interface may be capable of accepting user input for processing the received data packets. A set of data synchronization and recovery options may be provided via the user interface. The user interface may also provide a capability for the user to launch a data acquisition event initiating a stream of the multiple data streams.

In some implementations, extracting the timing information associated with the data packets may include processing an appended timestamp for each of the received data packets. The timestamp may be appended to each data packet of the plurality of data streams. A shared time instance of a subset of the plurality of data streams may be identified. The subset of the multiple data streams and each data packet of the plurality of data streams may have a same time duration. In other cases, extracting the timing information associated with the data packets may include identifying a synchronization time slot assigned by an initiator device for each of the multiple data streams. The data packets may be received via an isochronous channel.

In some aspects, the data packets may be received in separate channels. Each of the separate channels may be associated with at least one sensor configured to capture one of the multiple data streams. The multiple data streams may be assembled using the data packets of the separate channels. One or more of the separate channels may be prioritized, such that during reassembling the multiple data streams, the prioritized channel may assist lost data recovery.

For example, a High Reliability Audio Channel may be selected or defined for one of the multiple data streams. An application of the target device may define one audio channel to be a High Reliability Audio Channel. When the firmware reaches a state that it has to drop packets because the buffer is full, the source device can selectively drop packets from the buffer based on the channel number. Audio frames, from channels that are not in the High Reliability Audio Channel configuration, may be dropped from the buffer to make way for audio frames from the High Reliability Audio Channel. This enhances the probability of successful queueing and transmission of the audio frames from the High Reliability Audio Channel.

The application on the target device may then evaluate if better quality or synchronization may be achieved. For example, when the application's functionality is to determine if a gun-shot has been fired in the vicinity and warn the user, it is probably more important to determine the presence of gunshot for which it needs continuous audio at least on one channel while it might want to use multiple channels, when possible, to analyze and determine the direction of the gunshot. QoS among audio channels may also be introduced using one High Reliability Audio Channel. In addition, a descending order of reliability for other channels may also be defined by the application, explicitly or implicitly, such that audio frames from lower reliability channels may be dropped due to buffer limitation before removing audio frames from higher reliability channels.

In some cases, lost data packets occur as due to the removal above or in other cases, in a random and unpredictable manner. On the target device side, the lost data packets may be identified based on the extracted timing information. A location and an amount of the lost data packets may be identified for each of the multiple data streams. A recovery section of data packets may be generated to replace the lost data packets. The recovery section of data packets may include at least one of silent packets, noise packets, or synthesized packets. For example, a silent packet may provide a space filler for the lost audio section and allow the remaining data packets to be accurately synchronized. A noise packet achieves a similar result as the silent packet in terms of synchronization, but provides a volume similar to surrounding audio data to avoid a noticeable volume drop in one of the multiple channels. Synthesized packets may borrow signal from neighbor channels. For example, the synthesized packets may be generated by processing one of the multiple data streams having received data packets at the location of the lost data packets. The synthesized packets may be created by scaling or extrapolation of the received data packets at the location of the lost data packets to match the surrounding frames of the same channel. Other data recovery techniques may be used to make up for the lost data packets during synchronization.

Figure 9:
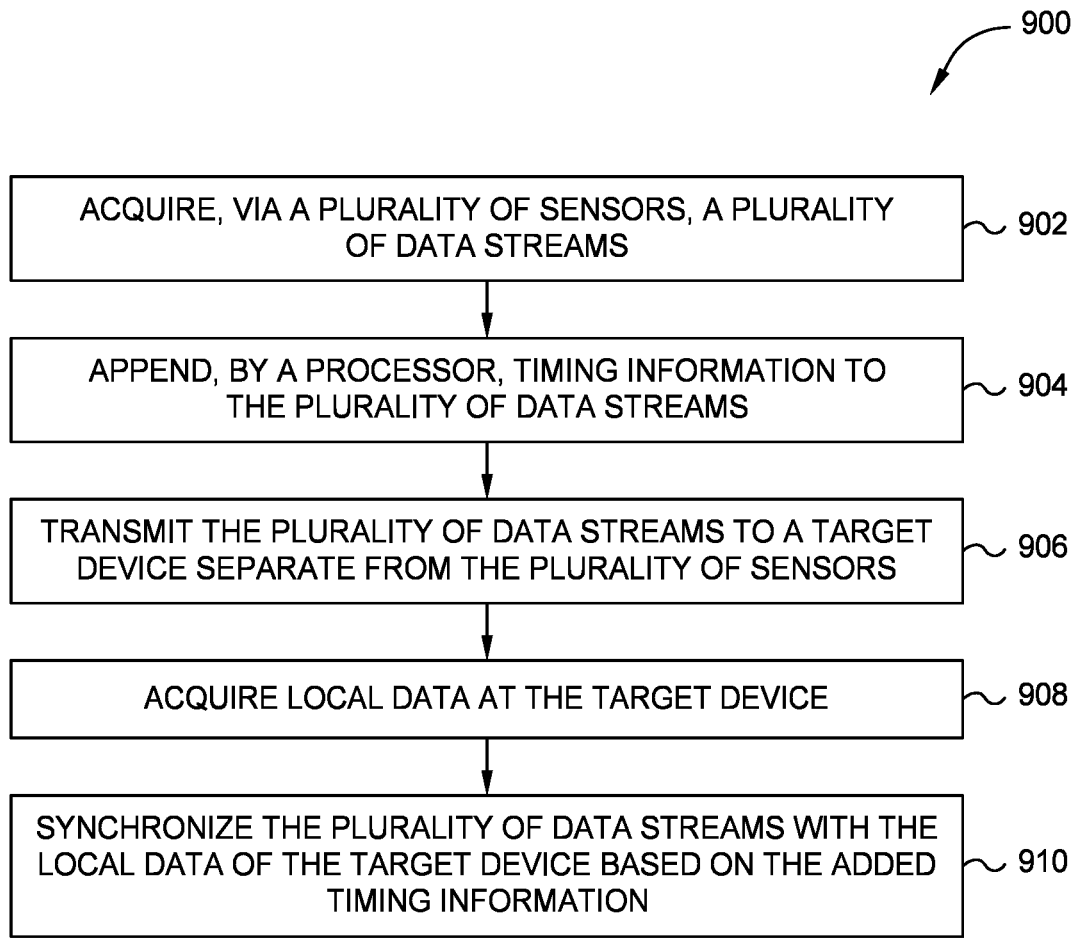
FIG. 9 is a flow diagram illustrating example operations that may be performed by a multi-sensor system, in accordance with certain aspects of the present disclosure.

FIG. 9 is a flow diagram illustrating example operations 900 that may be performed by a multi-sensor system, such as a system having both a source device and a target device. The operations 900 may begin, at 902, by acquiring, via multiple sensors, a number of data streams. A processor may append timing information to the number of data streams. The data streams may then be transmitted to the target device, which may acquire local data. For example, the target device may be a smartphone having a camera and records video when the source device provides surround sound recordings. The multiple data streams and the local data of the target device may then be synchronized using the time information.

Figure 10:
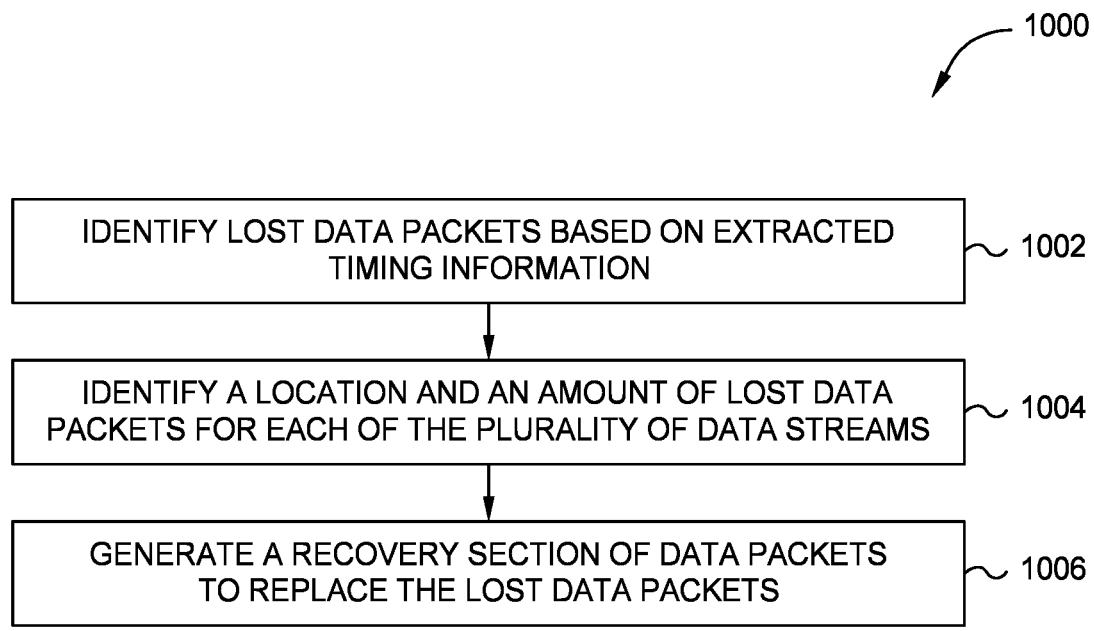
FIG. 10 is a flow diagram illustrating example operations of dropped frame recovery, in accordance with certain aspects of the present disclosure.

FIG. 10 is a flow diagram illustrating example operations 1000 of dropped frame recovery, in accordance with certain aspects of the present disclosure. The operations 1000 may be performed at a target device, such as a smartphone or a video capture device. The operations 1000 may begin, at 1002, by identifying lost data packets based on the timing information. At 1004, the target device may identify a location and an amount of lost data packets for each of the multiple data streams. At 1006, a recovery section of data packets is generated to replace the lost data packets. The recovery section of data packets may include at least one of silent packets, noise packets, or synthesized packets.

Among other advantages, the disclosed methods are based on data transport methods already supported by major semiconductor manufacturers, both Bluetooth Low Energy and Bluetooth BR/EDR, which do not require the isochronous channels in the new Bluetooth Core Specification version 5.2 standard. The disclosed method also applies to the Bluetooth Core Specification 5.2 standard. Supporting a wide variety of transports over Bluetooth Low Energy and Bluetooth BR/EDR, the mobile applications can choose the transport based on the nature of the application on different host platforms and the availability and performance of the transport on the device's Bluetooth system.

In some aspects, a device or system using the techniques disclosed herein may show traces of communication. These traces may be retrieved using tools like 'Packet Logger for iOS'. Insertion of synthesized audio frames even when there are frames dropped over the air (or reported as error packets in Packet Logger) are indicative that the techniques described herein are practiced. Audio can also be analyzed after using a Bluetooth jammer temporarily, forcing some audio frames to be dropped. In addition, a product that does not conform to Bluetooth 5.2 and does not use isochronous channels would practice the disclosed techniques for synchronization in order to support "dropped frame recovery" for even a mono/stereo channel, or to support more than one data channels synchronization.

In other aspects, the disclosed methods are applicable to wireless earbuds, earhooks, or ear-to-ear devices. For example, a host like a mobile phone may be connected over Bluetooth to a bud (e.g., right side) and that right-side bud further connects to the left-side bud using either a Bluetooth link or using other wireless technologies like NFMI or NFEMI. The left-side bud is first time-synchronized with the right-side bud. Audio frames (compressed in mono) are sent from the left-side bud with its timestamp (which is synchronized with the right bud's timestamp) as described in the technology above. The right bud will forward these encoded mono frames along with its own frames. The right bud will not wait for an audio frame from the left bud with the same timestamp. Instead, the right-bud sends whatever frame is available and ready to be sent with suitable packing. It is the responsibility of the receiving application in the host to assemble the packets using the timestamp and the channel number. The receiving application, depending upon how it is configured, can choose to merge the decoded mono channel of one bud and a decoded mono channel of the other bud into a stereo track based on the timestamp included in the header of the received encoded frames. The present disclosure allows the right-side bud to simply forward the audio frames from the left-side bud without decoding the frame. This helps to conserve battery power in truly wireless devices.

In some implementations, the techniques variously described herein can be used to improve virtual personal assistant (VPA) functionality. For instance, the techniques described herein can improve wake-up word (WuW) support for one or more VPAs (such as Google Assistant, Amazon's Alexa, Apple's Siri, Samsung's Bixby, Microsoft's Cortana, Tencent's Xiaowei, Huawei's Celia, and so forth). For example, in some such implementations, the techniques described herein enable offloading of WuW processing from the source device (e.g., headphones, earbuds, or some other wearable device) to the target device (e.g., a smartphone, tablet computer, or other device with relatively more processing capabilities). This can provide a benefit to implementing WuW functionality (for VPAs or other applications), as WuW processing may be large in size and/or use intensive computing resources such that a relatively more capable processing device (such as a smartphone) can provide better support for the WuW processing. In addition, by offloading the WuW processing from the source device to the target device, enabling multiple simultaneous WuW support (e.g., for two or more VPAs). This can benefit the user by allowing the best VPA to be used for a desired use case, either manually (e.g., by using the specific WuW to access the desired VPA) or automatically (e.g., by having a single WuW that routes the VPA request to the VPA service that can best handle the inquiry/request). For example, a VPA request to Amazon's Alexa (manually made by saying "Alexa" or automatically made via a custom WuW) may be used to play music while a VPA request to Google Assistant (manually made by saying "Hey Google" or automatically made via the custom WuW) may be used to schedule a calendar meeting. This can also lead to easier VPA WuW support certification, as the VPA service's software can be run on the target device as opposed to using the source device's software to detect and process WuWs. Further, the WuW support can be standardized across multiple different target devices to support multiple different source devices.

In some implementations, the techniques variously described herein can be used to determine contextual information for a source device and/or the user of the source device. For instance, the techniques can be used to help determine aspects of the user's environment (e.g., noisy location, quiet location, indoors, outdoors, on an airplane, in a car, etc.) and/or activity (e.g., commuting, walking, running, sitting, driving, flying, etc.). In some such implementations, the sensor data received from the source device can be processed at the target device to determine such contextual information and provide new or enhanced experiences to the user. For example, this could enable playlist or audio content customization, noise cancellation adjustment, and/or other settings adjustments (e.g., audio equalizer settings, volume settings, notification settings, etc.), to name a few examples. As source devices (e.g., headphones or earbuds) typically have limited resources (e.g., memory and/or processing resources), using the techniques described herein to offload the processing of data from sensors of the source device(s) to a target device while having a system to synchronize the sensor data at the target device provides a variety of applications.

In some implementations, the techniques variously described herein can be used for a multitude of audio/video applications. For instance, the techniques can be used for stereo or surround sound audio capture from a source device to be synchronized at a target device with video captured from the same source device, another source device, and/or the target device. For example, the techniques can be used to synchronize stereo or surround sound audio captured by microphones on a pair of headphones with video captured from a camera on or connected to the headphones, a separate camera, and/or the camera of a smartphone, where the smartphone (which is the target device in this example) performs the synchronization of the audio and video. This can enable real-time playback of stereo or surround sound audio with video (e.g., for live streaming), capture for recorded videos with stereo or surround sound audio (e.g., for posting to social media platforms or news platforms). In addition, the techniques described herein can enable wireless audio recording for audio or video messages without interrupting a user's music or audio playback. Thus, the techniques described herein enable the ability to produce immersive and/or noise-free audio for videos using a wireless configuration. Moreover, as can be understood based on this disclosure, the techniques described enable schemes that were only previously achievable using a wired configuration, so the techniques described free the user from the undesirable and uncomfortable experience of being tethered by one or more wires.

It can be noted that, descriptions of aspects of the present disclosure are presented above for purposes of illustration, but aspects of the present disclosure are not intended to be limited to any of the disclosed aspects. Many modifications and variations will be apparent to those of ordinary skill in the art without departing from the scope and spirit of the described aspects.

In the preceding, reference is made to aspects presented in this disclosure. However, the scope of the present disclosure is not limited to specific described aspects. Aspects of the present disclosure can take the form of an entirely hardware aspect, an entirely software aspect (including firmware, resident software, micro-code, etc.) or an aspect combining software and hardware aspects that can all generally be referred to herein as a "component," "circuit," "module" or "system." Furthermore, aspects of the present disclosure can take the form of a computer program product embodied in one or more computer readable medium(s) having computer readable program code embodied thereon.

Any combination of one or more computer readable medium(s) can be utilized. The computer readable medium can be a computer readable signal medium or a computer readable storage medium. A computer readable storage medium can be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium can be any tangible medium that can contain, or store a program.

The flowchart and block diagrams in the Figures illustrate the architecture, functionality and operation of possible implementations of systems, methods and computer program products according to various aspects. In this regard, each block in the flowchart or block diagrams can represent a module, segment or portion of code, which comprises one or more executable instructions for implementing the specified logical function(s). In some alternative implementations the functions noted in the block can occur out of the order noted in the figures. For example, two blocks shown in succession can, in fact, be executed substantially concurrently, or the blocks can sometimes be executed in the reverse order, depending upon the functionality involved. Each block of the block diagrams and/or flowchart illustrations, and combinations of blocks in the block diagrams and/or flowchart illustrations can be implemented by special-purpose hardware-based systems that perform the specified functions or acts, or combinations of special purpose hardware and computer instructions.

What is claimed is:

1. A method performed by a source device comprising:
acquiring, via a plurality of sensors, a plurality of data streams;
appending timing information for each of the data streams;
forming data packets of the plurality of data streams with the timing information;
transmitting the data packets to a target device configured to synchronize the plurality of data streams using the timing information; and
prioritizing one or more of the plurality of data streams based on an order of reliability received from the target device.

2. The method of claim 1, wherein the timing information comprises a timestamp for each data packet of the plurality of data streams, wherein the timestamp identifies a shared time instance of a subset of the plurality of data streams.

3. The method of claim 2, wherein the subset of the plurality of data streams and each data packet of the plurality of data streams have a same time duration.

4. The method of claim 1, further comprising:
providing a time slot by an initiator device, wherein providing the timing information for each of the plurality of data streams comprises assigning the time slot to each of the plurality of data streams.

5. The method of claim 4, wherein transmitting the data packets comprises transmitting the data packets using an isochronous channel.

6. The method of claim 1, wherein transmitting the data packets comprises transmitting the data packets in separate channels, each of the channels associated with at least one sensor configured to capture one of the plurality of data streams.

7. The method of claim 6, further comprising:
multiplexing the data packets prior to transmitting the data packets in the separate channels.

8. The method of claim 1, wherein the plurality of sensors includes at least one of a microphone, camera, accelerometer, gyroscope, or inertial measurement unit.

9. A method for providing audio synchronization to a user at a target device, the method comprising:
receiving, from a source device, data packets associated with a plurality of data streams acquired via a plurality of sensors;
decoding the plurality of data streams from the received data packets;
extracting timing information associated with the data packets;
synchronizing the plurality of data streams using the timing information;
determining an order of reliability; and
prioritizing one or more of the plurality of data streams based on the determined order of reliability.

10. The method of claim 9, further comprising:
providing a user interface on the target device, the user interface capable of accepting user input for processing the received data packets;
providing via the user interface a set of data synchronization and recovery options for the plurality of data streams; and
providing, via the user interface, a capability for the user to launch a data acquisition event initiating a stream of the plurality of data streams.

11. The method of claim 9, wherein extracting the timing information associated with the data packets comprises processing an appended timestamp for each of the received data packets, the timestamp appended to each data packet of the plurality of data streams and identifying a shared time instance of a subset of the plurality of data streams, wherein the subset of the plurality of data streams and each data packet of the plurality of data streams have a same time duration.

12. The method of claim 9, wherein extracting the timing information associated with the data packets further comprising identifying a synchronization time slot assigned by an initiator device for each of the plurality of data streams, wherein receiving the packets comprises receiving the packets via an isochronous channel.

13. The method of claim 9, wherein receiving the data packets comprises receiving the data packets in separate channels, each of the channels associated with at least one sensor configured to capture one of the plurality of data streams; and
the method further comprising reassembling the plurality of data streams using the data packets of the separate channels of sensors.

14. The method of claim 13, wherein reassembling the plurality of data streams using the data packets of the separate channels of sensors comprises prioritizing at least one of the separate channels.

15. The method of claim 9, further comprising:
identifying lost data packets based on the extracted timing information;
identifying a location and an amount of lost data packets for each of the plurality of data streams; and
generating a recovery section of data packets to replace the lost data packets, wherein the recovery section of data packets comprises at least one of silent packets, noise packets, or synthesized packets.

16. The method of claim 15, wherein generating the recovery section of data packets of synthesized packets comprises processing one channel of the plurality of data streams having received data packets at the location of the lost data packets of another channel of the plurality of data streams.

17. The method of claim 16, wherein processing the one channel of the plurality of data streams having received data packets at the location of the lost data packets of another channel of the plurality of data streams comprises at least one of scaling or extrapolation of the received data packets at the location of the lost data packets.

18. The method of claim 9, wherein the plurality of sensors includes at least one of a microphone, camera, accelerometer, gyroscope, or inertial measurement unit.

19. A device comprising:
a plurality of sensors configured to acquire a plurality of data streams;
a processor configured to:
append timing information for each of the data streams;
form data packets of the plurality of data streams with the timing information; and
prioritize one or more of the plurality of data streams based on an order of reliability received from a target device; and
a transceiver configured to transmit the data packets to the target device configured to synchronize the plurality of data streams using the timing information.

20. The device of claim 19, wherein the timing information comprises a timestamp for each data packet of the plurality of data streams, wherein the timestamp identifies a shared time instance of a subset of the plurality of data streams.

21. The device of claim 20, wherein the subset of the plurality of data streams and each data packet of the plurality of data streams have a same time duration.

22. The device of claim 19, wherein the plurality of sensors comprises eight microphones positioned to capture a surround-sound.

* * * * *